United States Patent
Ruge et al.

(10) Patent No.: US 9,886,811 B2
(45) Date of Patent: Feb. 6, 2018

(54) WAREHOUSING INSTALLATION, WAREHOUSING SYSTEM AND METHOD FOR OPERATING A WAREHOUSING SYSTEM

(71) Applicant: WRH WALTER REIST HOLDING AG, Ermatingen (CH)

(72) Inventors: Martin Ruge, Starrkirch-Wil (CH); Markus Felix, Richterswil (CH)

(73) Assignee: WRH Walter Reist Holding AG, Ermatingen (CH)

( * ) Notice: Subject to any disclaimer, the term of this patent is extended or adjusted under 35 U.S.C. 154(b) by 0 days.

(21) Appl. No.: 14/892,518

(22) PCT Filed: May 28, 2014

(86) PCT No.: PCT/EP2014/001447
§ 371 (c)(1),
(2) Date: Nov. 19, 2015

(87) PCT Pub. No.: WO2014/191106
PCT Pub. Date: Dec. 4, 2014

(65) Prior Publication Data
US 2016/0122127 A1 May 5, 2016

(30) Foreign Application Priority Data

May 31, 2013 (CH) .................................. 1040/13
May 31, 2013 (CH) .................................. 1041/13
(Continued)

(51) Int. Cl.
*G07F 11/34* (2006.01)
*G07F 11/10* (2006.01)
(Continued)

(52) U.S. Cl.
CPC .............. *G07F 11/34* (2013.01); *B65B 35/30* (2013.01); *B65B 61/22* (2013.01); *B65D 11/02* (2013.01);
(Continued)

(58) Field of Classification Search
CPC .................................. G07F 11/10; G07F 11/34
See application file for complete search history.

(56) References Cited

U.S. PATENT DOCUMENTS 2,527,541 A 10/1950 Gibbs
3,352,512 A 11/1967 James, Sr.
(Continued)

FOREIGN PATENT DOCUMENTS

BE 1 013 220 A7 11/2011
CN 201942318 U 8/2011
(Continued)

*Primary Examiner* — Thomas Randazzo
(74) *Attorney, Agent, or Firm* — Pauley Erickson & Kottis

(57) ABSTRACT

The invention relates to a warehousing installation (1) for a plurality of roller packaging units embodied as a rollable body, which comprises at least one storage device (20) for storing several rolling packaging units, a single storage device (30) for receiving a rolling packaging unit and for guiding said roller packing unit into the storage device, a rolling out device (40, 40', 40") for rolling away a rolling packaging unit stored in the storage device as a rolling away rolling packaging unit and a control device (50) for controlling the rolling out device (40).

20 Claims, 17 Drawing Sheets

(30) Foreign Application Priority Data

| May 31, 2013 | (CH) | ........................................ | 1042/13 |
| Mar. 24, 2014 | (CH) | ........................................ | 0446/14 |
| May 12, 2014 | (CH) | ........................................ | 0709/14 |

(51) Int. Cl.

| B65D 8/00 | (2006.01) |
| B65D 81/07 | (2006.01) |
| B65D 81/113 | (2006.01) |
| B65B 61/22 | (2006.01) |
| B65D 81/09 | (2006.01) |
| B65G 1/04 | (2006.01) |
| B65B 35/30 | (2006.01) |
| B65G 1/08 | (2006.01) |
| B65G 1/16 | (2006.01) |
| B65D 81/02 | (2006.01) |

(52) U.S. Cl.
CPC .............. *B65D 11/06* (2013.01); *B65D 81/02* (2013.01); *B65D 81/07* (2013.01); *B65D 81/09* (2013.01); *B65D 81/113* (2013.01); *B65G 1/04* (2013.01); *B65G 1/08* (2013.01); *B65G 1/16* (2013.01); *G07F 11/10* (2013.01)

(56) References Cited

U.S. PATENT DOCUMENTS

| 4,172,365 | A | | 10/1979 | McClintock | |
| 4,184,792 | A | | 1/1980 | Turnbo | |
| 4,919,300 | A | | 4/1990 | Anderson et al. | |
| 5,080,256 | A | * | 1/1992 | Rockola | G07F 11/12 |
| | | | | | 193/2 A |
| 5,176,287 | A | * | 1/1993 | Suris | G07F 11/10 |
| | | | | | 221/131 |
| 5,368,190 | A | * | 11/1994 | Hieb | G07F 11/34 |
| | | | | | 221/131 |
| 5,566,806 | A | * | 10/1996 | Reale | G07F 11/34 |
| | | | | | 194/215 |
| 6,050,438 | A | | 4/2000 | Kovens et al. | |
| 7,954,661 | B2 | | 6/2011 | Uchida et al. | |
| 8,657,156 | B2 | * | 2/2014 | Hsu | B07B 13/16 |
| | | | | | 221/256 |
| 8,991,592 | B2 | * | 3/2015 | Polleres | G07C 15/001 |
| | | | | | 193/12 |
| 9,373,211 | B2 | * | 6/2016 | Rose, Jr. | G07F 7/0609 |
| 2002/0036209 | A1 | * | 3/2002 | Chang | G07F 11/54 |
| | | | | | 221/121 |
| 2003/0089728 | A1 | * | 5/2003 | Ostler | G07F 11/32 |
| | | | | | 221/107 |
| 2007/0245763 | A1 | | 10/2007 | Uchida et al. | |
| 2008/0183326 | A1 | * | 7/2008 | Danelski | B65G 1/1376 |
| | | | | | 700/215 |
| 2009/0308884 | A1 | * | 12/2009 | Coughlin | G07F 11/14 |
| | | | | | 221/15 |
| 2010/0089941 | A1 | * | 4/2010 | Connier | B65G 1/08 |
| | | | | | 221/123 |
| 2016/0090225 | A1 | | 3/2016 | Ruge | |
| 2016/0114934 | A1 | | 4/2016 | Ruge | |
| 2016/0114956 | A1 | | 4/2016 | Felix et al. | |
| 2016/0176571 | A1 | | 6/2016 | Ruge | |

FOREIGN PATENT DOCUMENTS

| CN | 102 774 596 A | 11/2012 |
| DE | 74 35 980 U | 4/1976 |
| DE | 81 09 898 U1 | 11/1981 |
| DE | 297 04 283 U1 | 5/1997 |
| DE | 20 2006 017 824 U1 | 2/2008 |
| EP | 0 155 109 A2 | 9/1985 |
| EP | 0 526 148 A1 | 2/1993 |
| EP | 0 601 307 A1 | 6/1994 |
| EP | 0 915 127 A2 | 5/1999 |
| EP | 2 583 934 A1 | 4/2013 |
| FR | 2 483 896 A1 | 12/1981 |
| FR | 2 563 999 A1 | 11/1985 |
| FR | 2 852 305 A1 | 9/2004 |
| FR | 2 854 130 A1 | 10/2004 |
| GB | 898156 A | 6/1962 |
| GB | 2 166 719 A | 5/1986 |
| GB | 2 254 604 A | 10/1992 |
| GB | 2 482 476 A | 2/2012 |
| GB | 2 494 651 A | 3/2013 |
| JP | H01-256906 A | 10/1989 |
| JP | 2005-138896 A | 6/2005 |
| JP | 2006-16044 A | 1/2006 |
| WO | WO 01/060470 A1 | 8/2001 |
| WO | WO 02/25607 A1 | 3/2002 |
| WO | WO 2004/082420 A2 | 9/2004 |
| WO | WO 2008/052536 A2 | 5/2008 |
| WO | WO 2011/146646 A1 | 11/2011 |

\* cited by examiner

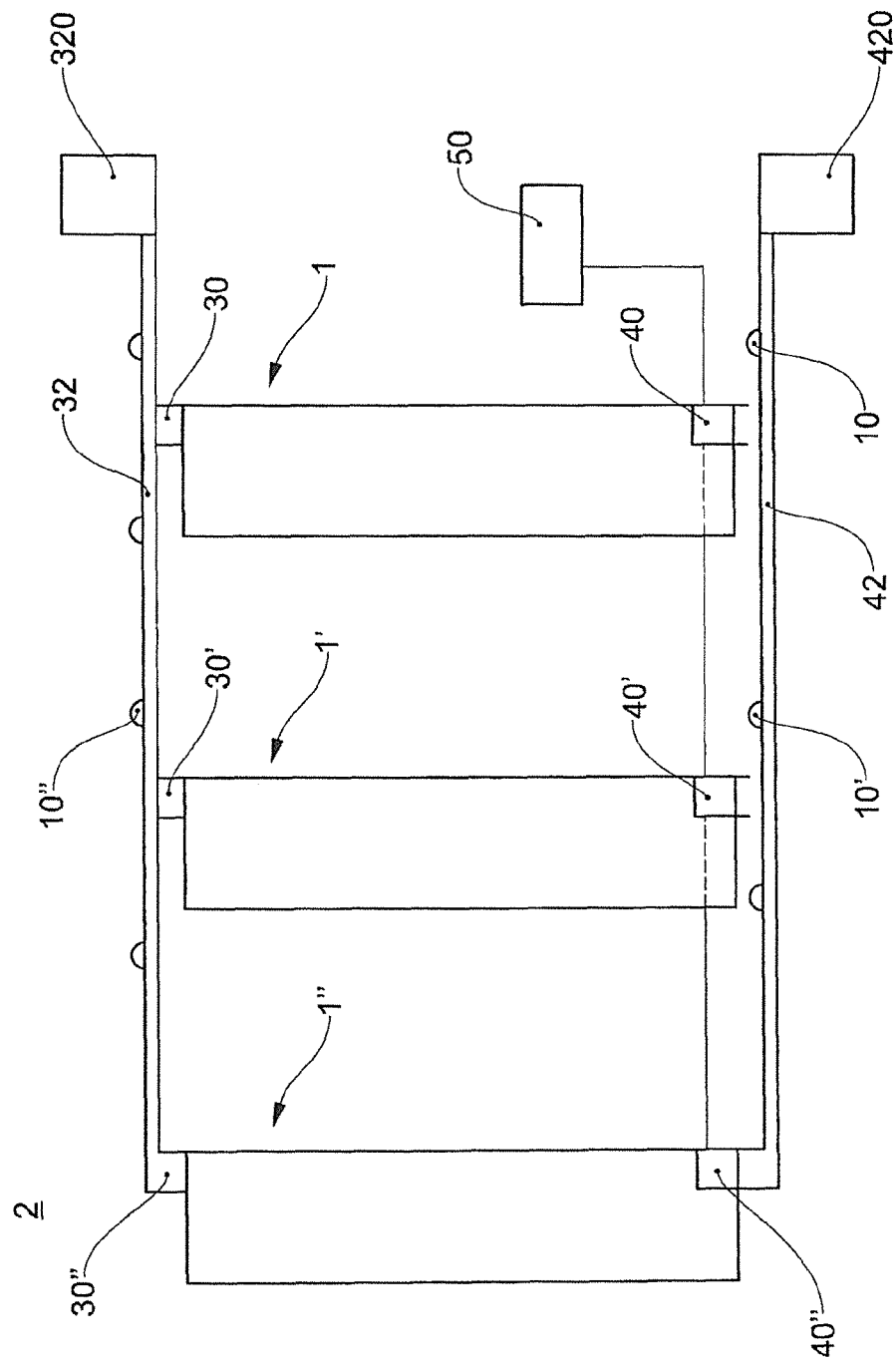

WAREHOUSING INSTALLATION, WAREHOUSING SYSTEM AND METHOD FOR OPERATING A WAREHOUSING SYSTEM

BACKGROUND OF THE INVENTION

Field of the Invention

The present invention relates to the sector of goods warehousing. Said present invention relates to a warehousing installation, a warehousing system, and a picking system, as well as to a method for operating a warehousing system.

Discussion of Related Art

Handling goods of all types which are manufactured, packaged, and finally shipped to the vendor or buyer particularly in the age of online shopping via the internet requires smart warehouse management comprising in particular transferring to stock, removing from stock, and transporting.

Many goods such as, for example, apparatuses, foodstuffs, pharmaceuticals, apparel, consumables, books, sound-recording media, etc. are already provided with their own packaging by the manufacturer and are optionally grouped to form larger units which are provided on standardized pallets, for example. These pallets are typically moved using fork-lift trucks, loaded onto trucks or unloaded therefrom, and are placed into racks of a warehouse and removed from the warehouse if and when required.

In certain sectors of the logistics industry, automated high-stack warehouses which are operated by automated loading and unloading devices interdisposed in the aisles between the individual racks are employed in particular.

Warehousing systems in which the goods last entering the warehouse must then be removed as the first because the racks in most cases may only be stacked and emptied from the one side are known. This type of warehousing is complex.

Furthermore, through-flow racks which operate on the FI-FO principle of "first in-first out" are known as dynamic warehousing systems. These racks may be stacked with goods from one side while goods which are infed simultaneously or which have been previously infed in a time-delayed manner may be removed from an opposite side. The goods in the through-flow rack are either actively conveyed by means of drivable conveying means or are propelled by gravity on slides or rolling floors to the removal side. Both types of conveying demand complex and expensive conveying systems such as roller track conveyors or spherical track conveyors. Transferring the goods to stock and removing the goods from stock may be performed manually or in a mechanized manner.

Such rack-type warehouses are disadvantageous in that the space conditions in the aisles between the racks are limited. In this way, removal from one rack may often be performed only when and if there is not already a removal from another rack taking place in the same aisle. In particular in the case of mechanized rack-type warehouses it is often not possible for a plurality of removals to be able to be carried out simultaneously in one aisle, since the removal devices would not find sufficient space for crossing in the aisles.

If the goods have to be transported on standardized pallets, grouped together to form larger units, such a larger unit has to be broken up in order for individual items of the goods to be provided for further processing. This causes additional problems when the units are held together on the pallet by strapping or film-wrapping.

It is indeed known, for example in the case of high-stack warehouses, for pallets having the goods located thereon to be slotted into the racks on roller tracks which slope downward toward the removal side, so that the pallets are self-actingly moved toward the removal side and the next pallet automatically follows on once the previous pallet has been removed from the rack. Nevertheless, the removed pallets have to be transported out of the warehouse, using complex servicing apparatuses.

The situation becomes even more difficult when the goods are individually stocked and destocked in their own packaging. When various goods having different types of packaging and/or sizes of packaging are present, the situation becomes even more complicated. Automated and mechanized stocking and destocking in this case is very hard to implement so that stocking and destocking typically is performed manually.

What has been stated above applies equally to transporting the goods from the manufacturer to the warehouse or from the warehouse to the vendor or retail customer.

Goods are preferably shipped in a picked manner to the vendors and retail customers, or else for intra-logistic processes (for example for the final assembly of components). A picking lot comprises an arbitrary number of articles from the warehoused range and is put together according to a picking order. A picking lot may be put together from a multiplicity of different articles or types of goods in the most varied numbers. The person putting together the order is referred to as a picker. In one embodiment the articles or goods are put together in an order container or a picking container, wherein the order containers or picking containers are fed to further processing steps such as to quality control, a packing station, a shipping station, etc.

In the case of sequenced picking, the individual orders are completed one after the other. Here, respective warehouse zones may be walked by a single picker, or a specific warehouse zone may be walked in each case by one and the same picker, the order being transferred from one picker to another picker at the borders between the warehouse zones.

In the case of a parallel picking method, the order is separated into part-orders, the part-orders being completed in parallel in the respective warehouse zones and the performed part-pickings being finally brought together. A series of a plurality of part-orders may be completed in the respective warehouse zones, one warehouse spot having to be in each case approached only once within a series.

The largest proportion of the entire picking time is caused by the distance which has to be walked during the removals. This time may be reduced by increasing the concentration of articles, in that highest-in-demand articles are warehoused at the beginning, or in that picking vehicles are employed.

In the case of picking robots the articles are located in shafts which are attached along a conveyor belt. Each article has a dedicated shaft. In order for a picking order to be carried out, a container on the conveyor belt is guided along the shafts, and the articles corresponding to the order are dispensed into the container in a centrally controlled manner.

Picking robots or picking fork-lifts are capable of approaching individual rack compartments, to remove an article therefrom using a gripper system, and of collecting articles in a container. In order for the rack compartments to be approached, a navigation system which is based on RFID tags disposed in the rack aisles, for example, is provided.

The gripper system is equipped with an image-processing system, for example, in order to identify articles and their position.

In the case of manual picking systems, a differentiation is made between goods-to-person systems and person-to-goods systems. In a goods-to-person system the containers having identical articles are fed on a conveyor belt to the pickers who remove the required articles from the respective container. In a person-to-goods system the pickers walk the respective warehouse zones in order to remove the required articles from the racks.

In order for picking to be facilitated picking sheets, mobile data acquisition apparatuses, bar code readers, RFID readers, or image/sound processing apparatuses may be employed.

JP 2006016044 proposes that a packaging container which is easy to transport, which can horizontally hold a packaged item, and which can also improve the receiving efficiency in a receiving room, be provided.

To this end, the spherical packaging container is provided with a first container which is a spherical hollow body, a second container which is a spherical hollow body received in the first container and which receives one packaged item, and with coupling means which intercouple the first container and the second container so as to have a degree of freedom of two or more axes.

A third spherical container, which is a spherical hollow body received in the first container and which receives the second container, is provided, wherein the inner face of the first container and the outer face of the third container, using first coupling elements which are positioned on a first straight line which runs through the center of the third container, are intercoupled at two points, and the inner face of the third container and the outer face of the second container, using second coupling elements which are positioned on a second straight line which runs through the center of the second container and is perpendicular to the first straight line, are intercoupled at two points.

Since the spherical packaging container has a spherical shape, the spherical packaging container for conveying thereof may be rolled by an operator. Accordingly, it is not always necessary for the spherical packaging container to be lifted during conveying, and the spherical packaging container may be conveyed more easily. Furthermore, a U-shaped channel may be used for conveying the spherical packaging containers. If an inclination of the channel is provided, the spherical packaging container in this case rolls from a high side to a lower side, propelled by gravity. The inner container may always be kept horizontal, even when the spherical packaging container is being rolled.

In this type of packaging and of a packaging container the extraordinarily complicated internal construction of the packaging which is impractical when processing comparatively large volumes of goods is disadvantageous. Further disadvantages lie therein that the packaged contents are not protected in a content-specific manner and efficient and economical warehouse management using these packaging containers is not disclosed.

Publication U.S. Pat. No. 7,954,661 B2 discloses a transport container which comprises a spherical container as well as heat-storing material which is disposed within the spherical container. The heat-storing material has a space in which an item to be transported may be accommodated. This space is located in the center of the spherical container. The heat-storing material surrounds the item to be transported, that is to say living cell cultures, in a spherical manner, such that practically the entire heat of the heat-storing material may be used to maintain the temperature of the items to be transported. The spherical shaped of the container has been chosen in order to minimize the heat-radiating outer face and to thus prolong the time during which the temperature is held. It is not provided that this transport container is transported in a rolling manner.

Publication CN 201942318 U discloses an intelligent system for real-time processing of orders with automatic delivery of goods to the customers, which operates using spherical transport containers which in each case comprise a spherical casing and an insert disposed therein, which is adapted to a rectangular, cylindrical or round container which is located in the sphere and which finally receives the goods per se. This system is conceived for long transport distances between the seller of the goods and the customer taking delivery of the goods, by way of urban and rural transport tubes and transport routes which are mostly underground.

A warehousing installation, a warehousing system, and a method for operating a warehousing system, which enable efficient and economical warehouse management and forming of picking lots, are desirable but not known from the prior art.

SUMMARY OF THE INVENTION

It is thus an object of the invention to provide a warehousing installation, a warehousing system, and a picking system, and a method for operating a warehousing system, which have the desired properties.

The object is achieved by the features of the independent claims.

A warehousing installation according to the invention for a multiplicity of rolling packaging units which are configured as rollable bodies comprises at least one storage device for storing a plurality of rolling packaging units, a storage receiving device for receiving a rolling packaging unit and for feeding this rolling packaging unit to the storage device, a storage removal device for discharging in a rolling manner a rolling packaging unit stored in the storage device as a rolling-away rolling packaging unit, and a control device for controlling the storage removal device. The rolling packaging units may be stored in the warehousing installation and at a later point in time be destocked therefrom. Depending on the specification of the storage device the rolling packaging unit which has been first transferred to storage, which has been last transferred to storage or a specifically or randomly selected rolling packaging unit is removed from storage, for example. The control device is adapted for providing warehouse management, wherein the rolling packaging units which are configured as rollable bodies enable efficient, energy-saving, and economical warehouse management.

In the context of the present invention the term rolling packaging units is also meant to include units which are configured as rollable bodies and in the case of which goods and/or goods containers are provided with means which permit rolling.

One preferred design embodiment of the warehousing installation is characterized in that it comprises a multiplicity of rolling packaging units which are configured as rollable bodies which particularly preferably have a round shape, preferably a spherical shape, a polyhedral shape, or a cylindrical spatial shape. On account thereof, rolling of the rolling packaging units is ensured.

One design embodiment of the warehousing installation is characterized in that the storage device comprises one or a plurality of the following devices: a storage roller track, a storage floor, a storage shaft, a storage silo. The storage roller track ensures defined receiving and storing of the roller-type packaging bodies, on account of which it may in particular be specified that the rolling packaging unit which is first transferred to storage is also removed therefrom first. As will be explained in more detail in the following, the storage roller tracks may be formed with the aid of the most varied of guide means, such as rails, channels, tubes, etc.; accordingly, said storage roller tracks represent one-dimensional storage devices which follow a precisely defined yet freely selectable spatial curve.

A storage floor enables a two-dimensional, horizontally planar, curved or sloped arrangement of rolling packaging units beside one another, wherein during removal from storage the packaging units are discharged via discharge points on the corner or peripheral regions or in the floor. Targeted removal from storage of a known rolling packaging unit at a specific position or random removal from storage is possible. A storage shaft is a special form of the storage floor, which is essentially disposed in a vertical manner. Said storage shaft enables a two-dimensional and vertical disposal of rolling packaging units, wherein a first group of rolling packaging units is also again first removed from storage and a random sequence is maintained within the group, for example. The storage shaft, too, need not necessarily define a plane but may indeed follow a curved spatial shape. The storage floor and the storage shaft as two-dimensional storage units differ from the previously described storage track in that the rolling packaging units therein are not present in a linear and one-dimensional sequence but may be disposed behind one another and beside one another in a two-dimensional pattern.

A storage silo enables the three-dimensional storage of rolling packaging units beside one another, behind one another, and on top of one another. A storage silo offers high storage capacity. When transferring to storage rolling packaging units having various contents, or various types of rolling packaging units, silo-typical rearrangement occurs, so that a random type is discharged in the case of discharging being effected via a single discharging device. Depending on circumstances, this may lead to a specific number of rolling packaging units having to be discharged (and returned to the silo) prior to the desired type becoming available.

The floor of a storage silo according to the invention may be formed by a storage floor, for example.

In the case of storage in storage shafts and in particular in storage silos a high mechanical load on the rolling packaging units which are at the bottom may occur from a certain filling level. In order to relieve said rolling packaging units at the bottom, baffle plates and/or intermediate floors which relieve the rolling packaging units at the bottom by absorbing a proportion of the dead weight of the rolling packaging units lying thereabove without impeding gravity-propelled rolling and self-acting rolling of the rolling packaging units are preferably provided in these storage devices.

Depending on the size of the rolling packaging units and depending on the contents and the filling level, an individual rolling packaging unit as a result of its own weight and contents may have a weight of a plurality of kilograms. In extreme cases the weight may be more than one hundred kilograms. This highlights that all parts of the plant, such as storage units, roller tracks, devices for transferring to storage and removing therefrom, turnouts, deflection and return devices have to be conceived for these loads, so as to ensure safe and reliable operation of the warehousing systems and warehousing installations.

This includes that it is ensured that rolling packaging units are guided in a positionally stable manner in the storage units, roller tracks, devices for transferring to storage and removal therefrom, turnouts, and deflection devices, and are not blocked or urged out of the track when subjected to pressure from subsequent rolling packaging units.

Therefore, baffle elements which may be incorporated in a vertical storage tube between two successive rolling packaging units, for example, and relieve a rolling packaging unit at the bottom from the pressure of the rolling packaging units lying thereabove, for example, are provided if and when required. The immediately following rolling packaging unit bears directly on the baffle element and can continue on its gravity-propelled path in the storage tube only once said baffle element has been removed.

By disposing a plurality of baffle elements in one storage track the latter may be subdivided into a corresponding number of segments which in turn may be disposed in a linear manner or a mutually interconnected manner by means of turnouts in a network or matrix structure.

One design embodiment of the warehousing installation is characterized in that the storage device comprises a storage roller track which has one or a plurality of the following devices: a railway, a channel, a tube. A railway may be advantageous for storing barrel-shaped or cylindrical rolling packaging units, for example. A channel or a tube may be advantageous for storing spherical or approximately spherical rolling packaging units, for example.

One design embodiment of the warehousing installation is characterized in that the storage device comprises a multiplicity of tubes, preferably in the form of tube stacks. This enables in particular dense storage of rolling packaging units, wherein it may be ensured that a rolling packaging unit which is first transferred to storage is also removed first from storage and from the tube again.

One design embodiment of the warehousing installation comprises a transport device for returning to the storage receiving device a rolling packaging unit which is rolling away from the storage removal device. In the case of erroneous removal from storage the respective rolling packaging unit may be swiftly returned to the storage device. The entire inventory of rolling packaging units may be automatically taken stock of with the aid of a return device. To this end, the rolling packaging units are removed from the storage device, detected, and subsequently returned and transferred to storage again.

A warehousing plant according to the invention, in the following referred to as a warehousing system, comprises a plurality of described warehousing installations, wherein rolling rolling packaging units are feedable to and/or dischargeable from the warehousing installations via one or a plurality of roller tracks, in particular are feedable to one or a plurality of warehousing installations via a storage receiving roller track and/or are dischargeable from one or a plurality of warehousing installations via a storage removal roller track. Infeeding and/or discharging of rolling packaging units on the roller tracks may be performed entirely without energy input. Moreover, rolling packaging units may be simultaneously removed from storage from a plurality of warehousing installations.

It is generally preferable that storage units, roller tracks, storage receiving and removing devices, turnouts, deflection devices, and all further elements of the warehousing systems and warehousing installations according to the invention participating in gravity-propelled transporting of the rolling packaging units permit low-friction and unimpeded self-acting running and self-acting starting up of the rolling packaging units. However, this does not exclude that if and when required, active conveying, in particular active conveying to counter gravity, is employed, for example as in the case of the previously described transport devices for returning rolling packaging units.

One design embodiment of the warehousing system comprises a plurality of roller tracks and one or a plurality of selection installations for defining on which of the plurality of roller tracks the rolling packaging unit is to move in a rolling manner. The rolling packaging units may be guided to specific warehousing installations, may be guided in a specific sequence to a goods discharge unit, etc.

One design embodiment of the warehousing system comprises one of a plurality of transport installations for transporting in a non-rolling manner rolling packaging units, in particular for transporting in a non-rolling manner rolling packaging units in the vertical and/or horizontal direction. In order for large horizontal distances to be overcome, the rolling packaging units may be re-fed potential energy at defined points, so that said rolling packaging units may be able to move on downstream roller tracks. In the case of very long conveying paths it has proven advantageous, in particular in order for the construction height of the plant to be kept low, for devices for lifting the rolling packaging units to be disposed at specific intervals. At the end of a portion of the roller track, said devices convey the rolling packaging units to the higher-altitude beginning of a subsequent portion of the roller track and, on account thereof, infeed potential energy to the rolling packaging units.

Since the roller tracks, in particular when circular-cylindrical and/or spherical rolling packaging units having good rolling properties are employed, only have to have a small angle of inclination in order to ensure starting up and onward rolling, the rolling packaging units in the warehousing system according to the invention may be transported across large distances even when the construction height is low. By employing the previously described devices for lifting the rolling packaging units (lifting devices for short), the transport paths may be extended practically without limitation.

In order for the employment of rolling packaging units of spherical shape and of a shape deviating from the spherical to be enabled in the same warehousing system, the roller tracks, storage devices, storage receiving devices, storage removal device, lifting devices, selection devices, and all other system parts which come into contact with the rolling packaging unit are configured such that both types of packaging units, or a plurality thereof, may be transported, stored, lifted, and selected.

One design embodiment of the warehousing system comprises a central controller and one or a plurality of detection devices for detecting an externally readable identification feature of rolling packaging units, wherein the central controller is specified for evaluating detected identification features and for controlling one or a plurality of warehousing installations, one or a plurality of transport installations, and/or one or a plurality of selection installations such that warehouse management of rolling packaging units is performable. By way of the detection devices the current position of rolling packaging units may be monitored, and by way of the central controller the rolling packaging units while being transferred to storage may be guided to required warehousing installations and while being removed from storage may be guided in a required sequence to a goods delivery unit.

The warehousing system described above according to the invention may be operated by a method which is characterized in that rolling packaging units are conveyed in a rolling manner, propelled by gravity, in a storage device, a storage receiving device and/or of a storage removal device.

According to the present invention the goods are incorporated in the rolling packaging units either in situ or they are supplied so as to be already in rolling packaging units.

According to preferred exemplary embodiments, warehousing is performed in a warehousing system, a warehousing installation, or a storage device or in parts thereof, under conditions of reduced oxygen. If and when required, transporting the rolling packaging units may be performed in an entirely gravity-propelled manner in a storage device. No supply of external energy is required, for example for electrically driven conveying devices. The low level of energy supply, or the complete absence thereof, and/or the reduction in the oxygen content very substantially reduces the risk of fire during storage. On account thereof, the risk of damage during storage is reduced, leading also to particularly favorable insurance terms and conditions.

The packaging bodies, like all mechanical parts of the plant, in particular the storage devices and the roller tracks, may be made from non-flammable or at least fire retardant materials. When plastics are employed, additives such as fire-retardant agents are preferably used in a known manner, so as to additionally reduce the risk of fire.

The invention further relates to a picking device for forming picking lots having in each case one or a plurality of roller-type bodies. The picking device comprises a plurality of warehousing shafts for warehousing roller-type bodies, at least one roller track for receiving roller-type bodies from the warehousing shafts, wherein the roller-type bodies continue to roll on the roller track, a centralized controller for receiving picking orders and for controlling releasing devices of the warehousing shafts in such a manner that picking lots which correspond to the picking orders are formed on the at least one roller track. In one variant, one or a plurality of the warehousing shafts is/are embodied as (a) storage shaft(s) as described above.

The roller-type bodies in each case contain in particular one article, wherein the articles and/or the roller-type bodies are grouped together according to a picking order. Since the picking lots are formed on the at least one roller track, no further means such as containers, etc., are required for transporting the picking lots onward.

One design embodiment of the picking device furthermore comprises a buffer device having a plurality of buffer roller tracks and adjoining the roller track, wherein at least one turnout is specified for feeding picking lots to the plurality of roller tracks according to a desired plan.

One design embodiment of the picking device furthermore comprises one or a plurality of connecting roller tracks which are disposed between the buffer roller tracks and are in each case specified for transferring picking lots or parts thereof from a first buffer roller track to a second buffer roller track.

Picking may be monitored by detecting the position of the roller-type bodies. Alternatively or additionally, the position of the roller-type bodies may be monitored by mathematical modeling, in particular with consideration of the weight of the roller-type bodies and the slope of the at least one roller track.

In one variant the at least one roller track has means for decelerating and/or accelerating the roller-type bodies. If the roller-type bodies are too tightly spaced on the at least one roller track, certain roller-type bodies may be decelerated and/or accelerated so that a desired spacing between the roller-type bodies is achieved, in particular for interdisposing therebetween a further roller-type body from a warehousing shaft. If the roller-type bodies are spaced too far apart, certain roller-type bodies may be decelerated and/or accelerated so that the roller-type bodies are more tightly spaced, in particular so as not to consume excessive space on the at least one roller track.

Subsequent to the at least one roller track the picking lots which are formed from roller-type bodies are preferably fed to a plurality of buffer roller tracks and repacking stations which are downstream thereof, so as to repack the articles which are disposed in the roller-type bodies in parcels and to deliver them to the recipient. Since repacking often requires manual operations and a corresponding temporal effort, a large volume of picking lots may be processed by way of parallel processing in a plurality of repacking stations.

The outer face of a rolling packaging unit is that face by way of which the rolling packaging unit rolls on a base surface. Said outer face should thus have sufficient hardness in order to withstand the stresses in terms of friction and/or impact which arise during the rolling operation over a sufficiently long operational period.

The outer face of a rolling packaging unit may be configured so as to be smooth, but may also have dimples or localized dents as is the case with a golf ball, so as to create specific running or rolling properties. Furthermore, if a rolling capability in any direction is undesirable, one or a plurality of encircling guide beads which impart a specific preferred direction to the rolling movement may be provided on the outer side.

Materials to be considered include in particular suitable plastics which have various degrees of transparency or may also be entirely opaque. It may also be conceivable for resilient glass such as used in returnable bottles, for example, to be employed in individual cases. In special cases, for example when thermal or electromagnetic properties, in particular shielding properties, for example, are of importance, the rolling packaging unit may also be manufactured from a suitable metal or a metal alloy.

If and when the material is by way of its nature opaque, visibility of the interior may be provided at certain points by access through inspection windows.

The rolling packaging units have a specific packaged content and may in each case have the same geometrical dimensions when viewed from the outside. The external geometrical dimensions of the rolling packaging units may also differ from one another and relate, for example, to spheres, barrels, cylinders, etc., having various diameters. The rolling packaging units may in each case have the same packaged content, a packaged content of a specific type, a completely individual packaged content, or a plurality or multiplicity of piece goods or containers. Depending on the construction, the dimensions, etc., of the rolling packaging units, packaged contents such as apparatuses, foodstuffs, pharmaceuticals, apparel, consumables, books, sound-recording media, etc., may be contained therein. In particular in order for the packaged content to be identified, the rolling packaging units have an externally readable identification feature in the form of a color code, a bar code, an RFID tag (RFID: radio frequency identification), etc.

Other types of attached codes, such as, for example, matrix codes, color codes, numerical codes, thermal codes, or holograms are likewise conceivable as information and/or identification means or as security features. All these means may be readable in an optical, magnetic, or wireless manner, specifically either as passive means which are externally checked, or as active means which themselves perform a transmission of information.

Moreover, the rolling packaging unit may be equipped with on-board intelligence, for example in the form of electronic means for data or signal processing, for example a microprocessor and corresponding data memories. Associated transmission and receiving installations may then wirelessly exchange signals with the surroundings via antenna elements which are attached to the outer side. However, it is also conceivable for externally accessible electrical contacts via which access is enabled to internal circuitry to be disposed on specific points of the casing.

In the context of internal electronic installations in the rolling packaging units, internal power storage units and/or power converters which store mechanical energy (spring, gas pressure), thermal energy (thermal storage unit), or electromagnetic energy (capacitor, battery, accumulator, coil, etc.) or convert other forms of energy into electrical energy (piezo-electric converter, inductive converter, etc.), may be provided.

It is furthermore conceivable for positioning means with the aid of which the location of the unit may be determined and tracked at any time to be provided within the rolling packaging unit. In the extreme case, positioning by means of the GPS system or comparable systems is to be considered. Permanent magnets which are probed from the outside or which may trigger switching operations when passing specific locations may also be disposed within the rolling packaging unit.

BRIEF DESCRIPTION OF THE DRAWINGS

The invention is to be explained in more detail in the following by means of exemplary embodiments in conjunction with the drawing, in which:

FIG. 1b schematically shows a warehousing system having three warehousing installations which are disposed in series and to which rolling packaging units may be infed via a roller track and from which the rolling packaging units may be guided away via a roller track;

FIG. 14a shows an enlargement of a detail of FIG. 14, in which a deflection device and a guide device are shown;

DETAILED DESCRIPTION OF THE INVENTION

Figure 1:
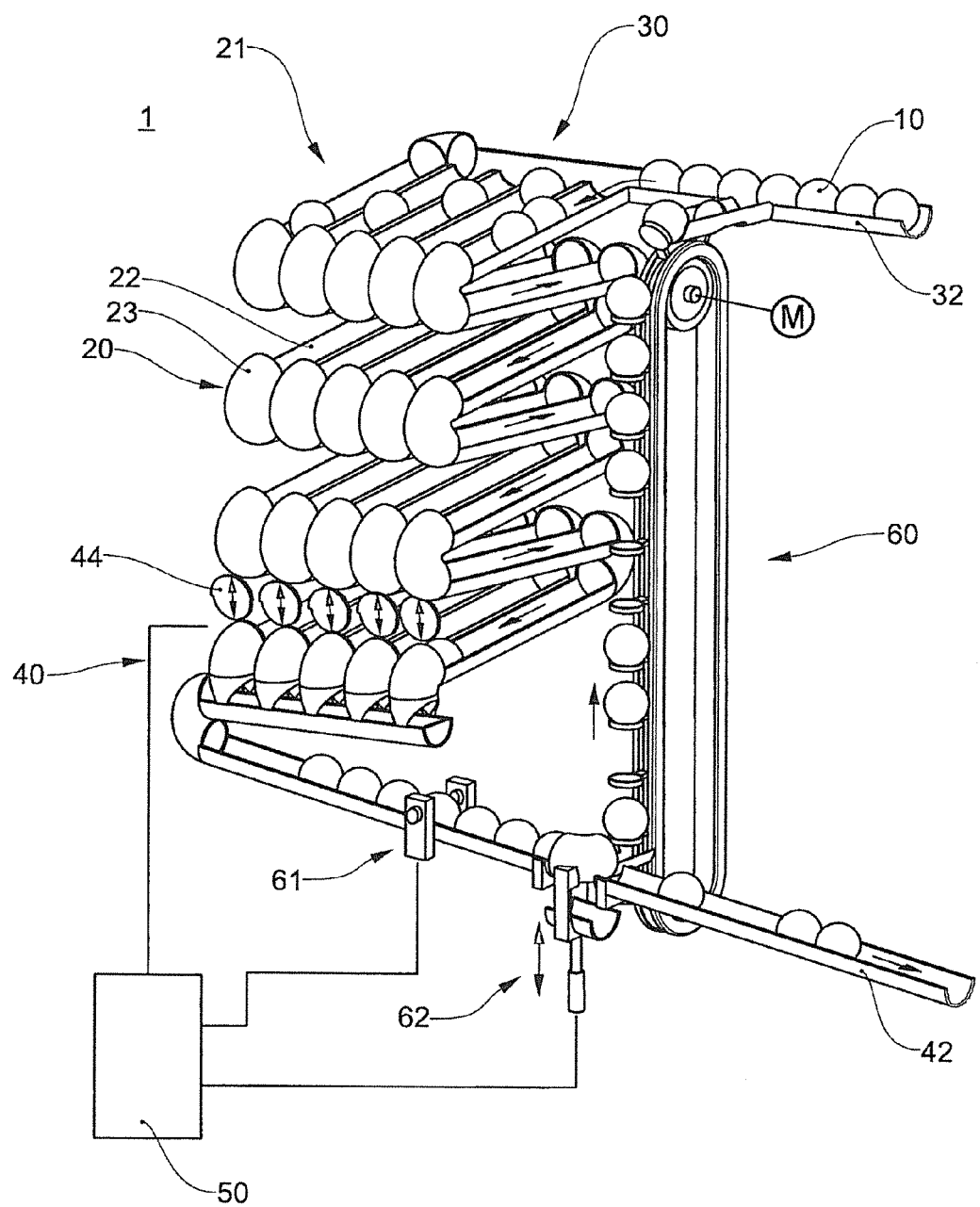
FIG. 1 shows a first exemplary embodiment of a warehousing installation for accommodating a multiplicity of rolling packaging units in a plurality of storage roller tracks, which is provided with a transport device for returning selected rolling packaging units.

FIG. 1 schematically shows a warehousing installation 1 and a multiplicity of rolling packaging units 10 which are configured as rollable bodies and which in particular roll along a storage receiving roller track 32 and roll away on a storage removal roller track 42, rolling along and rolling away meaning in relation to the warehousing installation 1.

The outer face of a rolling packaging unit is that face by way of which the rolling packaging unit rolls on a base surface. Said outer face should thus have sufficient hardness in order to withstand the stresses in terms of friction and/or impact which arise during the rolling operation over a sufficiently long operational period.

The outer face of a rolling packaging unit may be configured so as to be smooth, but may also have dimples or localized dents as is the case with a golf ball, so as to create specific running or rolling properties. Furthermore, if a rolling capability in any direction is undesirable, one or a plurality of encircling guide beads which impart a specific preferred direction to the rolling movement may be provided on the outer side.

Materials to be considered include in particular suitable plastics which have various degrees of transparency or may also be entirely opaque. It may also be conceivable for resilient glass such as used in returnable bottles, for example, to be employed in individual cases. In special cases, for example when thermal or electromagnetic properties, in particular shielding properties, for example, are of importance, the rolling packaging unit may also be manufactured from a suitable metal or a metal alloy.

If and when the material is by way of its nature opaque, visibility of the interior may be provided at certain points by access through inspection windows.

The storage receiving roller track 32 and the storage removal roller track 42 are component parts of a roller track network which comprises a plurality of roller tracks and which is erected in a warehousing system at a warehouse facility which is provided for warehousing all types of goods, for example. Rolling of the rolling packaging units 10 in a specific direction is established in particular on account of a corresponding slope of the respective roller track, and is a result of the slope and of gravity without external energy being supplied.

The rolling packaging units 10 may be configured so as to be spherical, as is schematically illustrated in FIG. 1. The roller tracks, such as the storage receiving roller track 32 or the storage removal roller track 42, for example, may be configured so as to be channel-shaped, as is schematically illustrated in FIG. 1. However, variants of embodiments in which the rolling packaging units 10 are embodied so as to be barrel-shaped, cylindrical, polyhedral, etc., are also possible. Furthermore, variants of embodiments in which the roller tracks such as the storage receiving roller track 32, the storage removal roller track 42, and/or the roller track network of the warehouse facility, which comprises a plurality of roller tracks, are/is configured from wires, bars, rails, tubes, square or hexagonal hollow sections, etc., are possible.

In one variant, the rolling packaging units 10 are embodied as described in one or a plurality of international PCT applications titled "Transportable packaging unit and method for manufacturing such a packaging unit", "Packaging body having a rollable external shape and method for manufacturing a packaging unit having such a packaging body", "Transport mounting for a transported object and method for transporting a transported object having such a transport mounting", or "Rollable transport container and method for transporting a payload using such a transport container", which have been filed by the same applicant on the same date.

Figure 2A:
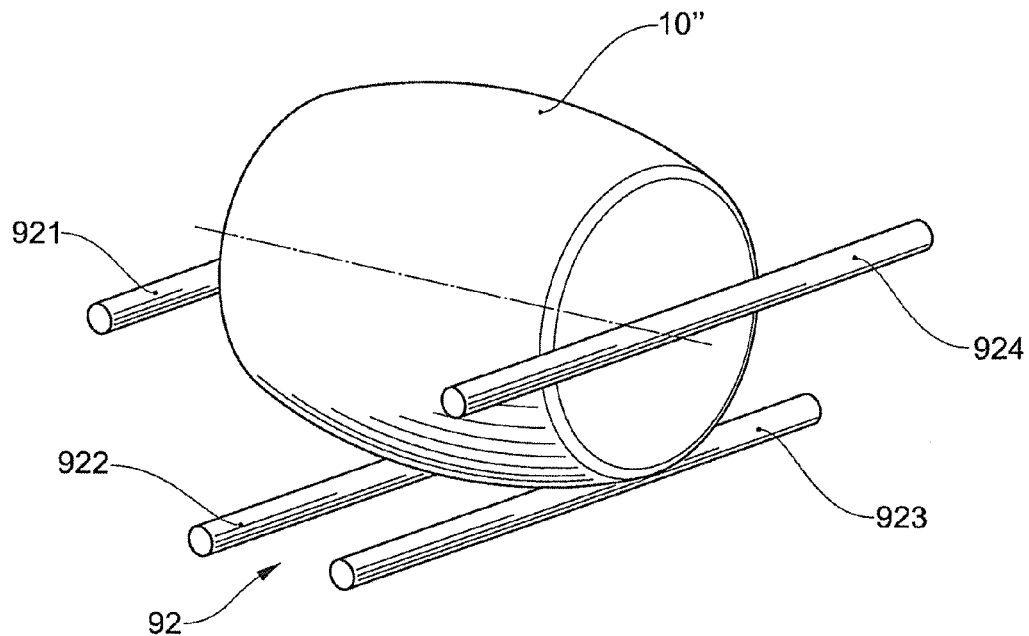
FIG. 2a shows a barrel-shaped rolling packaging unit in a track which is formed from four guide bars which are required for moving the former.

FIG. 2a schematically shows a rolling packaging unit 10″ which is embodied so as to be barrel-shaped and which is guided by a roller track 92 which is formed from four wires, bars, rails, etc., 921, 922, 923, 924, which are disposed therebelow and laterally thereto.

Figure 2B:
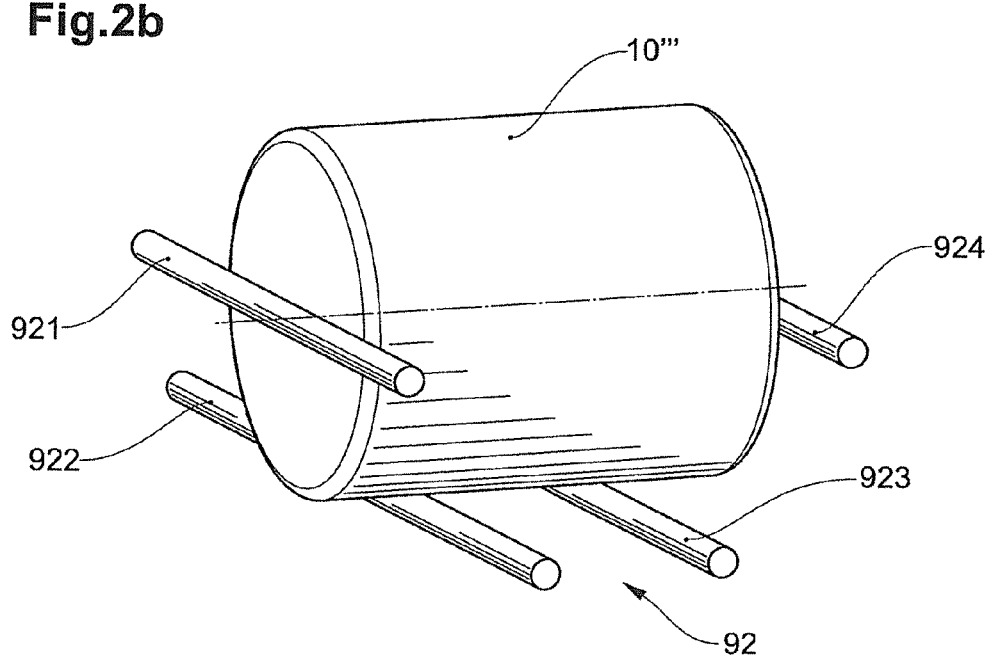
FIG. 2b shows a cylindrical rolling packaging unit in a track which is formed from four guide bars which are required for moving the former.

FIG. 2b schematically shows a rolling packaging unit 10‴ which is embodied so as to be cylindrical and which is guided by a roller track 92 which is formed by four wires, bars, rails, etc., 921, 922, 923, 924, which are disposed therebelow and laterally thereto.

Figure 3A:
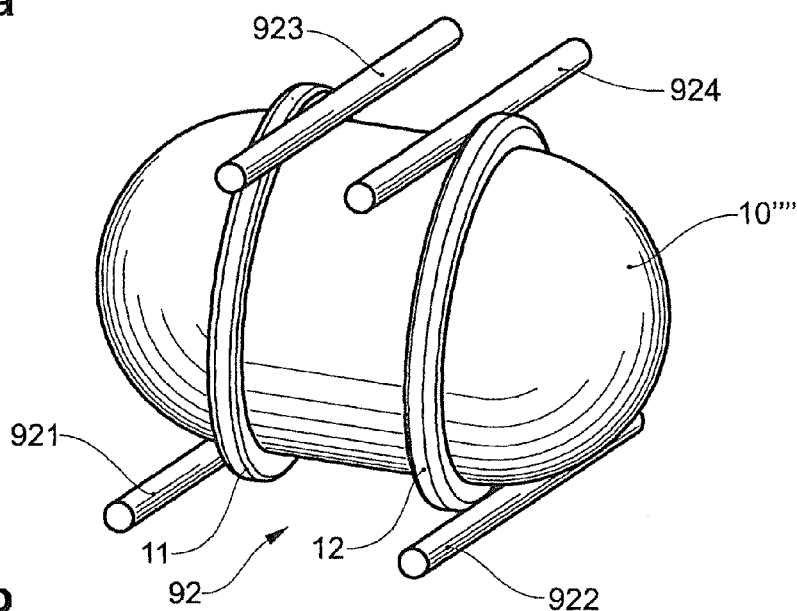
FIGS. 3a-3c show a further rolling packaging unit having a cylindrical main body and encircling guide elements for interacting with four guide bars.
Figure 3B:
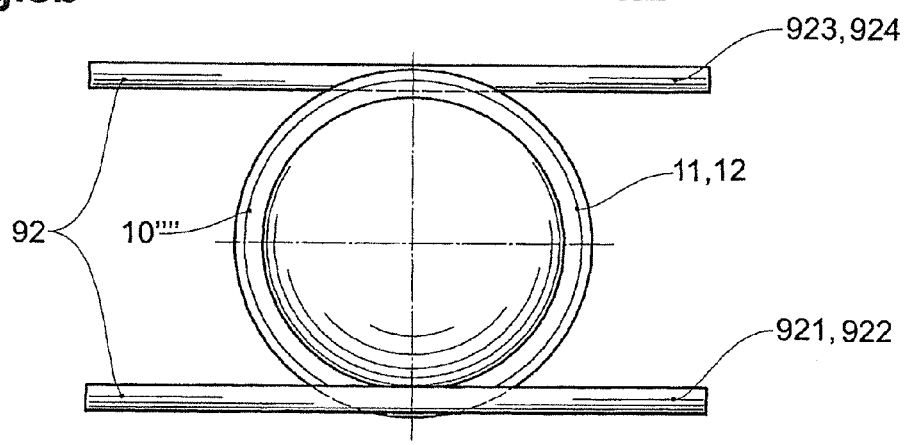
Figure 3C:
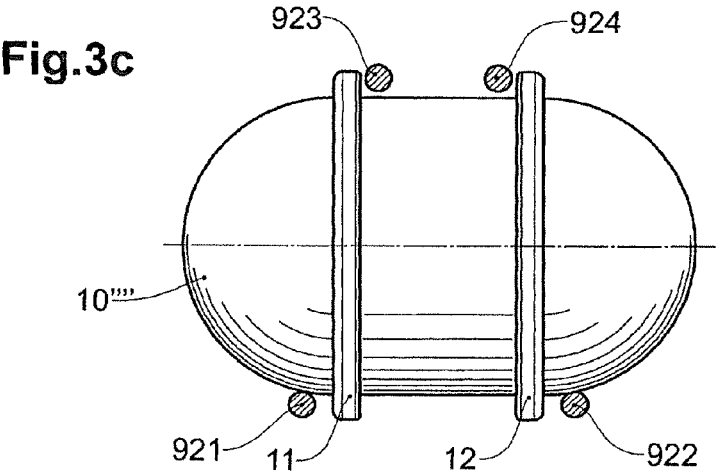

FIGS. 3a, 3b, 3c schematically show a rolling packaging unit 10″″ which is embodied so as to be cylindrical and which, as a continuation of the cylindrical shape, has spherical caps and is guided in a roller track 92 which is formed from in each case two guide bars 921, 922, 923, 924 which are disposed above and below. The guide bars 921, 922, 923, 924 are embodied as wires, bars, etc. A perspective illustration is shown in FIG. 3a, a side view is shown in FIG. 3c, and a front elevation view is shown in FIG. 3b. The rolling packaging unit 10'''' has encircling guide elements 11, 12, which are embodied as rings or collars, etc., and are provided for interaction with the guide bars 921, 922, 923, 924. As can be seen from FIGS. 3a, 3c, the two lower guide bars 921, 922 are spaced apart in such a wide manner that the guide elements 11, 12 of the rolling packaging unit 10'' are located between the lower guide bars 921, 922. On account thereof, the rolling packaging unit 10'''' is laterally guided, in particular in the event of the guide bars 921, 922 dictating a change of direction. As may be likewise seen from FIGS. 3a, 3c, the upper guide bars 923, 924 are spaced apart in such a close manner that they just come to lie between the guide elements 11, 12. On account thereof, alternative or additional lateral guiding of the rolling packaging unit 10'''' results.

Figure 3D:
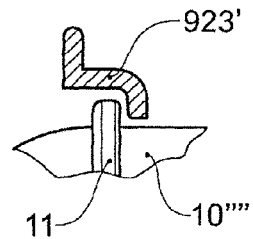
FIG. 3d shows a detail enlargement having an alternative design embodiment of an upper guide bar with an L-shaped profile.

An alternative form of an upper guide bar 923' which has an L-shaped profile is shown in FIG. 3d. The L-shaped profile increases the stability of the guide bar and, on account thereof, has the effect of diminished sagging of the guide bar 923'. On account of the design of the profile and the disposal in relation to the guide element, precise tracked guiding of the rolling packaging unit in the guide means is ensured, on the one hand, and it is avoided that the outer wall of the packaging unit contacts the guide rail, on the other hand. On account thereof, abrasion and mechanical stress of the outer wall are avoided and limited to the guide elements which are accordingly made from a suitable material.

The guide bars illustrated in FIGS. 2a and 2b may also be replaced by two L-shaped profiles or a U-shaped profile, for example in order for the flexural strength and thus the stability of the roller track to be increased. It is evident to a person skilled in the art that in all variants (having guide bars and/or profiles) various types (spherical, cylindrical, etc.) of rolling packaging units may be transported in the same roller track, provided the former are suitably selected in terms of size and shape.

The rolling packaging units have a specific packaged content and may in each case have the same geometrical dimensions when viewed from the outside. The external geometrical dimensions of the rolling packaging units may also differ from one another and relate, for example, to spheres, barrels, cylinders, etc., having various diameters. The rolling packaging units may in each case have the same packaged content, a packaged content of a specific type, a completely individual packaged content, or a plurality or multiplicity of piece goods or containers. Depending on the construction, the dimensions, etc., of the rolling packaging units 10, packaged contents such as apparatuses, foodstuffs, pharmaceuticals, apparel, consumables, books, sound-recording media, etc., may be contained therein. In particular in order for the packaged content to be identified, the rolling packaging units have an externally readable identification feature in the form of a color code, a bar code, an RFID tag (RFID: radio frequency identification), etc.

Other types of attached codes, such as, for example, matrix codes, color codes, numerical codes, thermal codes, or holograms are likewise conceivable as information and/or identification means or as security features. All these means may be readable in an optical, magnetic, or wireless manner, specifically either as passive means which are externally checked, or as active means which themselves perform a transmission of information.

Moreover, the rolling packaging unit may be equipped with on-board intelligence, for example in the form of electronic means for data or signal processing, for example a microprocessor and corresponding data memories. Associated transmission and receiving installations may then wirelessly exchange signals with the surroundings via antenna elements which are attached to the outer side. However, it is also conceivable for externally accessible electrical contacts via which access is enabled to internal circuitry to be disposed on specific points of the casing.

In the context of internal electronic installations in the rolling packaging units, internal power storage units and/or power converters which store mechanical energy (spring, gas pressure), thermal energy (thermal storage unit), or electromagnetic energy (capacitor, battery, accumulator, coil, etc.) or convert other forms of energy into electrical energy (piezo-electric converter, inductive converter, etc.), may be provided.

It is furthermore conceivable for positioning means with the aid of which the location of the unit may be determined and tracked at any time to be provided within the rolling packaging unit. In the extreme case, positioning by means of the GPS system or comparable systems is to be considered. Permanent magnets which are probed from the outside or which may trigger switching operations when passing specific locations may also be disposed within the rolling packaging unit.

Figure 4:
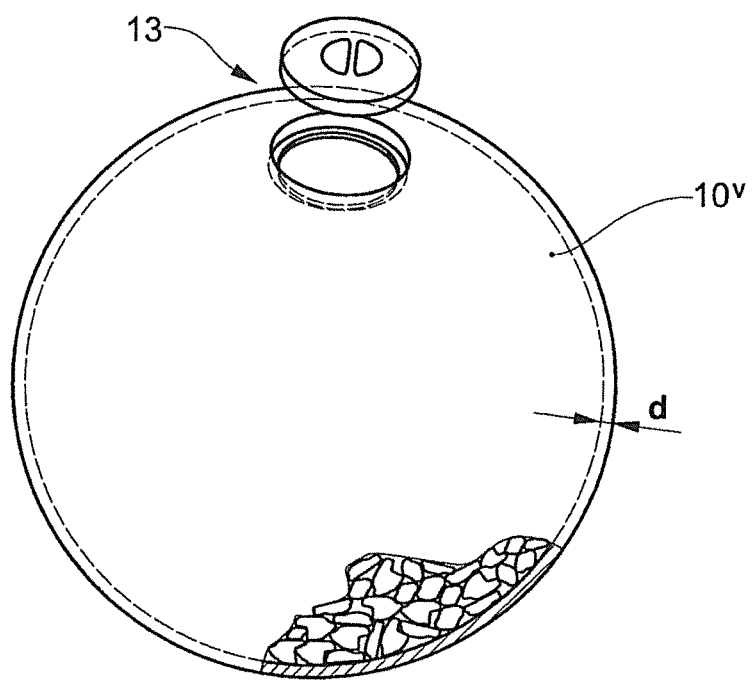
FIG. 4 shows a hollow and spherical rolling packaging unit.

A hollow and spherical rolling packaging unit $10^V$ which has a spherical shell having a wall thickness d is schematically illustrated in FIG. 4. Goods, for example bulk goods or liquids, may be packaged in the rolling packaging unit $10^V$ by way of a closable access 13. The closable access 13 is closed by a lid, for example, in particular by way of a threaded connection, a bayonet connection, etc. The rolling packaging unit $10^V$ which in FIG. 4 is shown in a partial section is particularly suitable for goods which are present in liquid or free-flowing form, etc., that is to say for foodstuffs such as beverages, sugar, cereals, coffee beans, coffee powder, or similar, for consumables such as gasoline, oil, or semi-finished products in the form of pellets, granules or powder, such as employed for example in the chemical and pharmaceutical industry, or for any other goods of such type. In the case of such rolling packaging units for liquid or pulverulent goods, sealing means are preferably disposed on the lid and/or on the access opening in the rolling packaging unit 10'.

Figure 5:
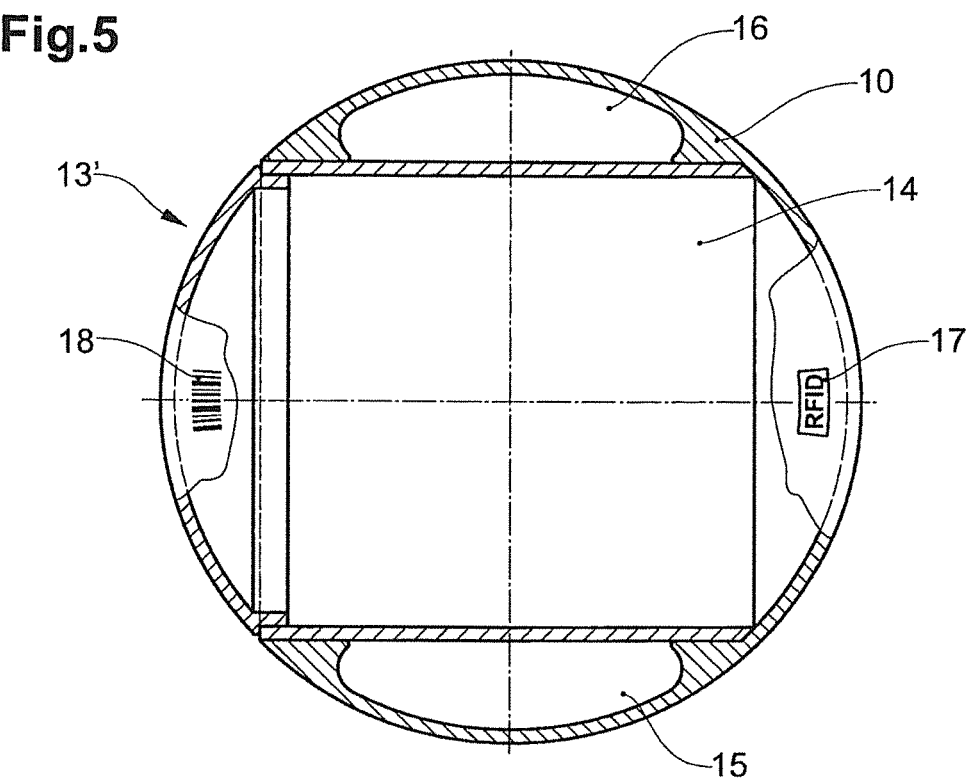
FIG. 5 shows a spherical rolling packaging unit having a substantially cubical interior space and an encircling hollow space.

A spherical rolling packaging unit 10 having an interior space 14 which is configured so as to be substantially cubical and is accessible via a closable access 13' is schematically illustrated in FIG. 5. The closable access 13' comprises a lid which is embodied as a spherical cap, wherein a threaded closure, a bayonet closure, etc., is provided for closing. As is schematically illustrated in FIG. 5, the rolling packaging unit 10 on the outer side has clearances 15, 16, which serve for weight reduction or for material savings, respectively, and may be configured as grips in order for the rolling packaging unit 10 to be able to be manually handled and carried. In the case of further embodiments (not shown), the outer side is closed, and rollable ballast spheres which displace the center of gravity toward the bottom may be disposed in the internal annular clearance.

As is schematically indicated in FIG. 5, the rolling packaging unit has externally readable identification features, such as at least one RFID tag 17 and one bar code 18, which identify the packaged content disposed in the interior space 14 and/or the rolling packaging unit 10. The cubical interior space 14 of the rolling packaging unit 10 is particularly suitable for ashlar-shaped or cubical goods, for example cardboard boxes having apparel, shoes, apparatuses, books, catalogs, etc., to be disposed therein.

A plurality of optically detectable identification features such as bar codes are preferably disposed so as to be distributed across the outer side of the rolling packaging unit so as to ensure that at least one identification feature may be detected by a detection or reading unit in any position of the rolling packaging unit.

Further embodiments of spherical rolling packaging units are described in the applications filed on the same date by the same applicant, titled "Transportable packaging unit and method for manufacturing such a packaging unit" and "Packaging body having a rollable external shape and method for manufacturing a packaging unit having such a packaging body", to which explicit reference is made here. These rolling packaging units are particularly suitable for employment in the warehousing system according to the invention and in the warehousing installation according to the invention.

Figure 6A:
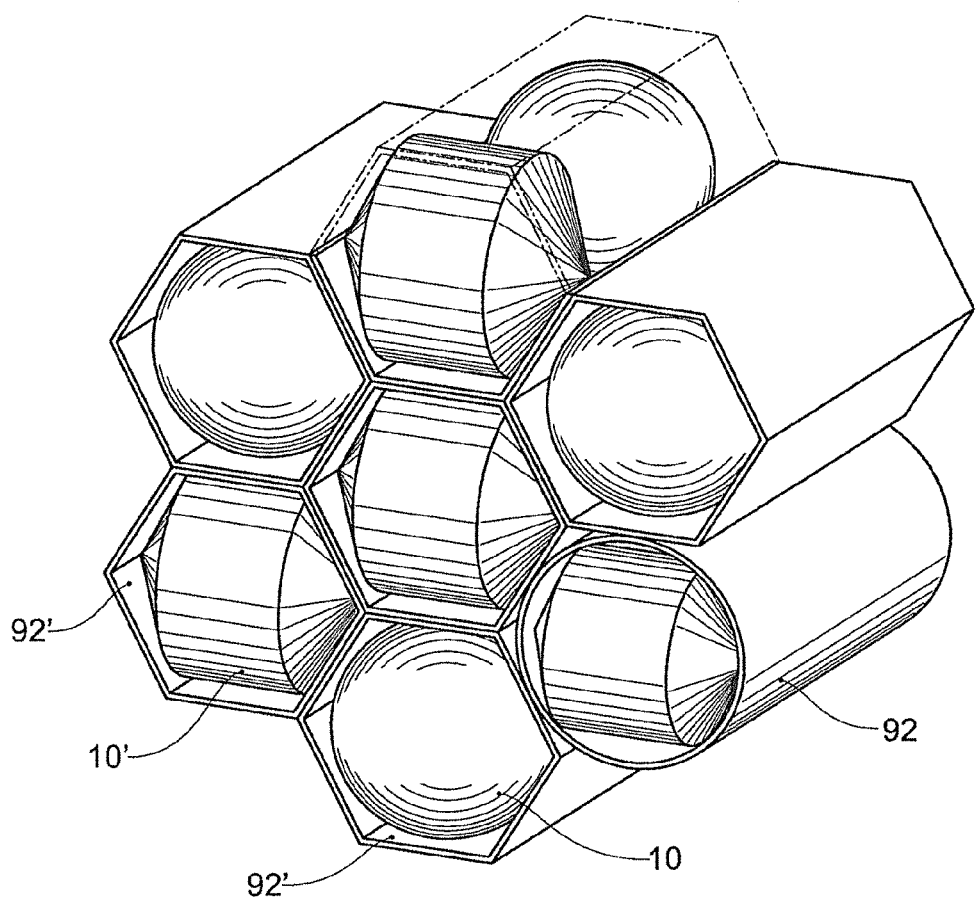
FIG. 6a shows a perspective view of spherical and gyroscopic rolling packaging units in tightly packed hexagonal storage roller tracks combined with a storage roller track which is circular in the cross section, wherein the roller tracks are illustrated in only a short portion and the side walls of a roller track are drawn so as to be partially transparent.
Figure 6B:
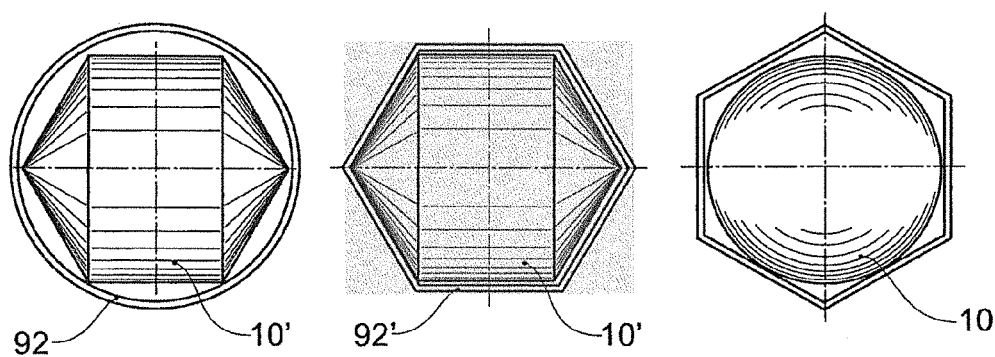
FIG. 6b shows three cross sections through individual round and hexagonal roller tracks according to FIG. 6a, wherein a gyroscopic rolling packaging unit is illustrated in the left and central picture, respectively, and a spherical rolling packaging unit is illustrated in the right picture.

Embodiments of spherical 10 and gyroscopic 10' rolling packaging units and of a plurality of hexagonal roller tracks 92, 92' of round cross section are shown in FIGS. 6a, 6b. The roller tracks 92, 92' are sloped such that the rolling packaging units 10, 10' may move therein in a rolling and/or rotating manner in the direction of the slope. FIG. 6a is a perspective illustration, while FIG. 6b shows a cross section of individual roller tracks 92, 92', wherein transport in a roller track of hexagonal cross section 92' and in a round embodiment 92 of the roller track is shown for a gyroscopic rolling packaging unit 10'. It can be derived from the illustration on the extreme right that the roller tracks of hexagonal cross section may be readily and efficiently used also for spherical rolling packaging units. As can be seen from FIGS. 6a, 6b, a compact and space-saving arrangement results for a plurality of roller tracks 92, 92' which are guided in parallel beside and on top of one another, on account of which the storage density and the processing capacity can be further increased.

The roller tracks may be oriented so as to be sloped away from the horizontal right up to being completely vertical.

Figure 7:
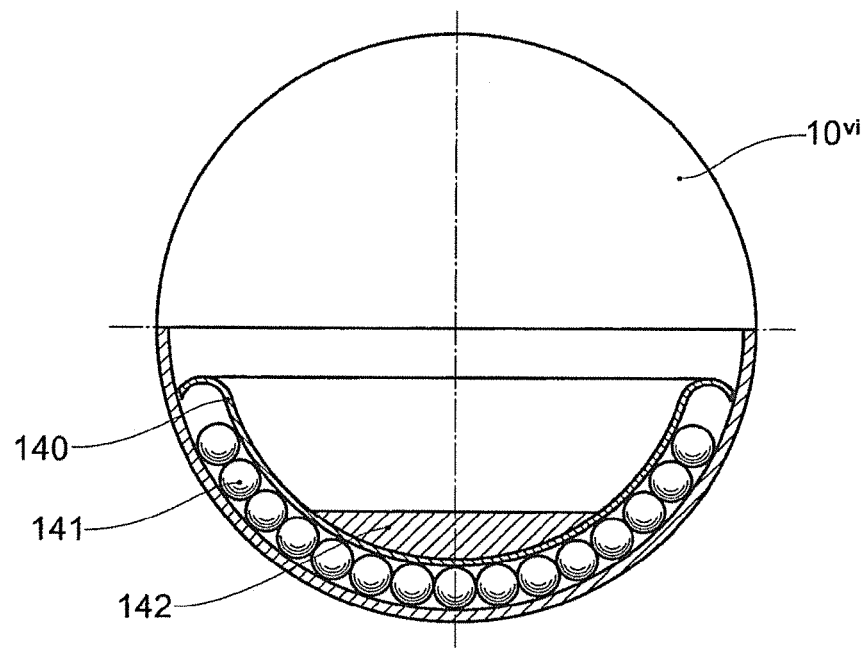
FIG. 7 shows a further embodiment of a rolling packaging unit according to the invention, in a partially sectional illustration.

FIG. 7 schematically shows a cross section of a spherical or cylindrical rolling packaging unit $10^{vi}$, in which a semi-spherical or semi-cylindrical insert 140 which is mounted on a roller bearing 141 is disposed. The insert 140 is freely movable inside the rolling packaging unit $10^{vi}$ so that goods which are disposed on a base surface 142 of the insert 140 are always identically oriented so as to be vertical, independently of rolling movements of the rolling packaging unit $10^{vi}$.

Figure 8:
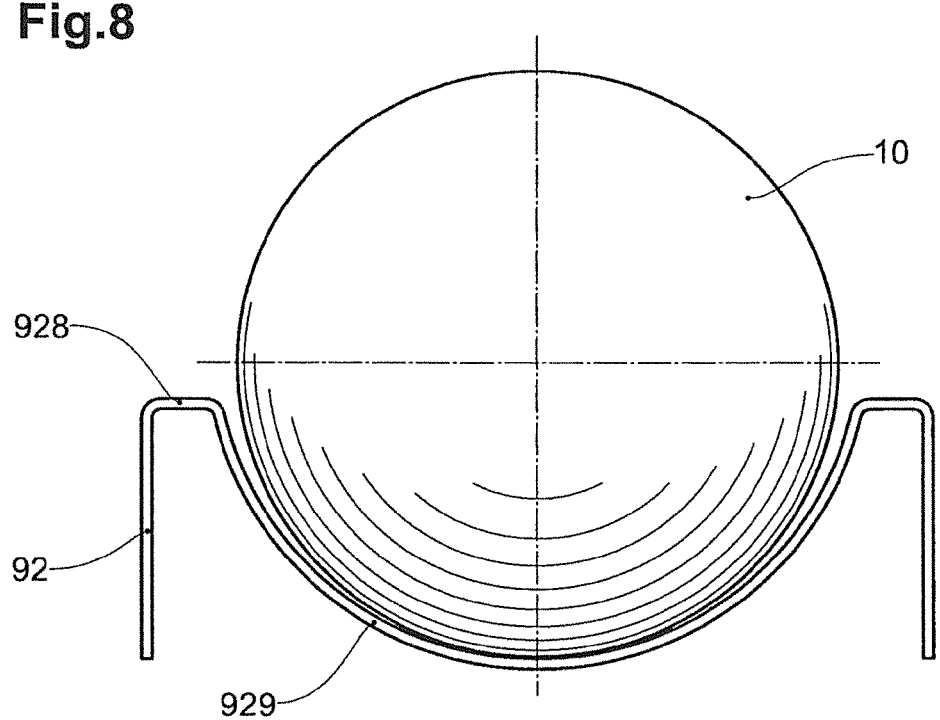
FIG. 8 shows a view of a spherical rolling packaging unit in a channel-shaped roller track.

FIG. 8 schematically shows a cross section of a spherical rolling packaging unit 10 and of a channel-shaped roller track 92 which has a semi-circular cross section 929 and shoulders 928 adjacent thereto. As can be seen from FIG. 8, the radius of the rolling packaging unit 10 has been selected so as to be somewhat smaller than the radius of the semi-circular cross section 929. On account thereof, a good rolling capability of the rolling packaging unit 10 results. The channel-shaped roller track extends laterally up to approximately the central plane of the rolling packaging unit 10 and thus ensures lateral guiding of the rolling packaging unit 10. In the event of changes in direction of the roller track 92, for example in curves, the respective outside shoulder may be pulled higher. The shoulders 928 stabilize the roller track 92 and are moreover suitable for fastening the latter to desired surroundings, for example to a frame or to a support in a warehouse building.

The described roller tracks 92, the storage receiving track 32, and the storage removal track 42 are manufactured in particular from a stable and load-bearing material such as metal, plastics, etc. They may be a component part of a roller track network (not illustrated in the figures) of a warehouse facility, on which the rolling packaging units 10 may move in a rolling manner and which extends across the warehouse facility which is provided for receiving goods for warehousing and removing them therefrom. The warehouse facility may comprise a warehouse shed, a warehouse building, a plurality of warehouse buildings, a warehouse site, etc.

The warehousing installation 1 which is schematically illustrated in FIG. 1 has a storage device 20 for storing a plurality of rolling packaging units 10. In the embodiment illustrated in FIG. 1, the storage device 20 is constructed from a total of five storage stacks 21 which are disposed in parallel. Each of the storage stacks 21 has storage roller tracks 22 which are disposed vertically on top of one another and are sloped in alternating directions, wherein storage roller tracks 22 which lie on top of one another at the ends are interconnected by deflection devices 23. A rolling packaging unit 10 in such a storage stack 21 on account of gravity rolls in each case from a higher altitude storage guide 22 via a deflection device 23 to the next lower storage roller track 22 and thus from the highest altitude to the lowest altitude storage guide 22. For the sake of clarity, only one storage stack 21, one storage roller track 22, and one deflection device 23 are provided with a reference sign in FIG. 1. However, the reference signs apply to all storage stacks 21, storage roller tracks 22, and deflection devices 23 which are respectively illustrated in FIG. 1.

As is illustrated in FIG. 1, a storage receiving device 30 for receiving rolling packaging units 10 which roll in on the storage receiving roller track 32 and for infeeding these rolling packaging units 10 to the storage device 20 is located between the storage receiving roller track 32 and the storage device 20. As illustrated in FIG. 1, the storage receiving device 30 is a continuation of the storage receiving roller track 32, for example, wherein the rolling packaging units 10 randomly roll into the uppermost storage roller track 22 of one of the storage stacks 21 and on account of gravity in the respective storage stack 21 roll in the direction of the lowermost storage roller track 22 of this storage stack 21.

However, the storage receiving device 30 may have actively controlled selection devices by way of which it is selected for rolling packaging units 10 which are rolling in and being received, into which of the storage stacks 21 a respective rolling packaging unit 10 is to be guided. Such a selection device may comprise detectors and slides, for example, wherein the detectors by way of reading a color code, a bar code, an RFID tag, etc., for example, detect what packaged contents are contained in a received rolling packaging unit 10, wherein it is determined by way of a slide which is deployable downstream of the junction for a respective storage stack 21 in the storage receiving device 30, into which storage stack 21 the received rolling packaging unit 10 having the respective packaged content is guided.

Receiving for storage of rolling packaging units 10 into the individual storage stacks 21 may thus be performed randomly or according to a plan. In the case of receiving for storage according to a plan, rolling packaging units 10 having in each case identical packaged contents may be disposed in one storage stack 21, respectively, for example. In the embodiment illustrated in FIG. 1, for example five different types of rolling packaging units 10 could in each case be separately disposed in one of the storage stacks 21. If the quantities of the five different types of rolling packaging units 10 differ, this leads to unequal filling of the individual storage stacks 21. However, if the rolling packaging units 10 all contain identical packaged contents, or if uniform filling of the storage stacks 21 is desired despite their being different types of rolling packaging units 10, uniform filling of the storage stacks 21 may be achieved with little effort by random receiving for storage in the storage stacks 21.

The storage device 20 illustrated in FIG. 1 has five storage stacks 21 into which the rolling packaging units 10 rolling along may be guided. The storage device 20 may of course have an arbitrary number of storage stacks 21, wherein the width of the storage device 20 substantially is a result of the number of storage stacks 21. The storage stacks 21 illustrated in FIG. 1 have in each case seven storage roller tracks 22 and six deflection devices 23. The storage stacks 21 may of course have an arbitrary number of storage roller tracks 22 and deflection devices 23. The height of the storage device 20 is in particular a result of the inclination angle of the storage roller tracks 22 and of the length thereof.

The inclination angle is selected in such a manner that a defined height of the storage device 20 is adhered to and rolling of the rolling packaging units 10 is ensured. The inclination angle is furthermore selected in such a manner that rolling is not performed at excessive velocity and the packaged content is not damaged by the accelerations arising at the deflection device 23 (and at the storage slides 44 which will be described in the following). In one variant of embodiment the storage roller tracks 22 have varying inclination angles, for example the higher altitude storage roller tracks 22 have a larger inclination angle than the lower altitude storage roller tracks 22, on account of which a rolling packaging unit 10 is initially guided through the storage stack at comparatively high velocity, the velocity being gradually reduced thereafter, for example.

The holding capacity of the storage device 20 may be adapted to the desired requirements in particular by modifying the number of storage stacks 21 and/or the number of storage roller tracks 22.

As is schematically illustrated in FIG. 1, a storage removal device 40 is interdisposed between the storage device 20 and the storage removal roller track 42. The storage removal device 40 comprises actively actuatable storage slides 44 which are in each case adjacent to the lowest altitude storage roller track 22. Depending on the actuation of the storage slides 44, rolling packaging units 10 are retained in the storage device 20 or are discharged therefrom. As is schematically illustrated in FIG. 1, the rolling packaging units 10 are discharged via a collection roller track and a deflection device to the storage removal roller track 42.

Controlling the storage removal device 40, that is to say in particular actuating the storage slides 44, is performed by way of the control device 50 which is illustrated in FIG. 1; for example, an actuation signal which is transmitted as an electric command signal to a drive element which actuates the respective slide is generated by the control device 50. The control device 50 may comprise a computerized central unit which is connected via signal lines such as, for example, Ethernet cables, to drive elements which are embodied as electric actuator motors. Of course, other solutions, such as wireless transmission of actuation signals, hydraulic or pneumatic drive elements, etc., are conceivable.

By way of the arrangement illustrated, rolling packaging units 10 may be infed to the warehousing installation 1 and stocked therein until a point in time which is determined by the control device 50. When goods are inwardly delivered, they are packed in rolling packaging units 10, provided said goods have not already been packed therein. The rolling packaging units 10 are infed via the storage receiving roller track 32 to the warehousing installation 1, wherein the storage removal device 40, that is to say in particular the slides 44, is closed so as to stock the rolling packaging units 10 in the warehousing installation 1. In the event of an incoming order, the storage removal device 40 is controlled in such a manner that a rolling packaging unit 10, or a plurality thereof, is/are discharged from the warehousing installation 1 to the storage removal roller track 42.

The storage receiving roller track 32 and the storage removal roller track 42 are sloped in the direction of the warehousing installation 1 or away therefrom, and in a warehouse building may extend across vast distances, such as a few meters, for example, or up to more than one hundred meters. Infeeding and discharging the rolling packaging units 10 via the storage receiving roller track 32 and via the storage removal roller track 42 is performed entirely without a supply of external energy and is therefore cost-effective.

A plurality of warehousing installations 1, 1', 1" which are constructed in an analogous manner to the warehousing installation 1 illustrated in FIG. 1, or as storage silos, and are disposed along the storage receiving roller track 32 and the storage removal roller track 42 are schematically illustrated in FIG. 1b. FIG. 1b schematically shows a warehousing system 2 which comprises a plurality of warehousing installations 1, 1', 1" which may be infed rolling packaging units 10 and said rolling packaging units 10 may be discharged therefrom via roller tracks.

Inward delivery of goods is performed at a goods receiving point 320 and delivery is performed at a goods delivery point 420. According to the present invention, the goods are either incorporated in the rolling packaging units in situ, or the goods are inwardly delivered so as to be already packed therein. Receiving for storage of rolling packaging units 10" in the respective warehousing installation 1, 1', 1" is performed by the respective storage receiving devices 30, 30', 30". Removal from storage of rolling packaging units 10, 10', which is controlled by the control device 50, for example, is performed by the respective storage removal devices 40, 40', 40". While a first rolling packaging unit 10 is being discharged from a first warehousing installation 1, discharging a second rolling packaging unit 10' from a second warehousing installation 1' may be simultaneously performed, independently of whether or not discharging the rolling packaging unit 10 from the first warehousing installation 1 has been completed or not. This is in contrast to the high-stack warehouses known in the prior art in which the aisle between the racks cannot be used until discharging an item from a rack has been fully completed. As opposed to the prior art, rapid access which is optimized in terms of energy is thus enabled by the illustrated warehouse installation 1.

Figure 1A:
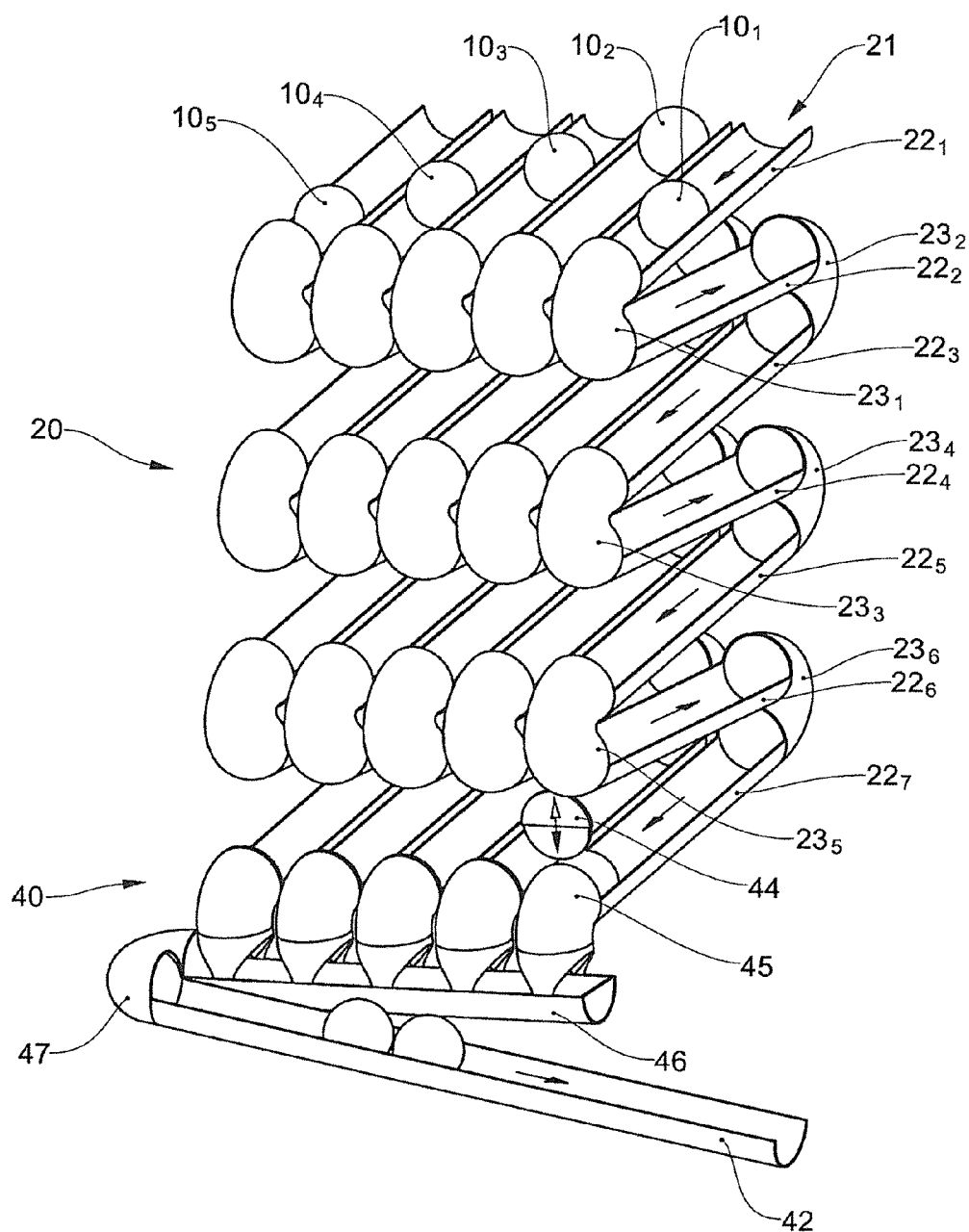
FIG. 1a shows a detail view of the storage device of the warehousing installation according to FIG. 1, comprising five storage stacks.

FIG. 1a schematically shows a detail view of the storage device 20 which is a component part of the warehousing installation 1 illustrated in FIG. 1. A plurality of rolling packaging units 101, 102, 103, 104, 105, which move in a rolling manner from top to bottom in the storage tracks which are disposed in each case to form storage stacks 21, are shown. The storage stack 21 which is illustrated in FIG. 1a at the extreme right and which is constructed like the remaining four storage stacks of the storage device 20 that are illustrated in FIG. 1a comprises a total of seven segments of storage roller tracks $22_1$, $22_2$, $22_3$, $22_4$, $22_5$, $22_6$, $22_7$, and a total of six deflection devices $23_1$, $23_2$, $23_3$, $23_4$, $23_5$, $23_6$.

The topmost first segment of the storage roller track $22_1$, which in FIG. 1a is shown to slope toward the front, adjoins the topmost first deflection device $23_1$ which in turn adjoins the topmost but one segment of the storage roller track $22_2$, which in FIG. 1a is shown to slope toward the rear. A first rolling packaging unit $10_1$ is illustrated in the topmost first segment of the storage roller track $22_1$ in FIG. 1a. As a result of the slope of the topmost first segment $22_1$, this rolling packaging unit 10 rolls in the direction of the topmost first deflection device $23_1$. This first rolling packaging unit $10_1$ is deflected in this topmost first deflection device $23_1$ to the topmost but one segment $22_2$ and then rolls in the direction of the topmost but one deflection device $23_2$ which adjoins the topmost but one segment of the storage roller track $22_2$.

The first rolling packaging unit $10_1$ thus rolls in a zigzag manner from top to bottom in the storage stack 21, until stopped by the storage slide 44 which adjoins the lowermost seventh segment of the storage roller track $22_7$, if said storage slide 44 is closed. For the sake of clarity, a storage slide 44 is illustrated only for the just described storage stack 21 situated to the far right in FIG. 1a. However, such a storage slide is likewise provided for the remaining four storage stacks.

The storage slide 44, which is a component part of the storage removal device 40, by way of a control signal which is generated by a control device (not illustrated in FIG. 1a), is switchable between a closed position in which the rolling packaging units 10 are retained in the storage stack 21, and an opened position in which the rolling packaging unit 10 which is retained by the storage slide 44 is released.

As is schematically illustrated in FIG. 1a, delivery devices 45 which transfer the rolling packaging units 10 to a collection roller track 46 from which the rolling packaging units 10 after deflection by a collection deflection device 47 are transferred to the storage removal roller track 42 adjoin the lowermost storage roller tracks 22 and the storage slides 44. In the event of the orientation of the storage removal roller track 42 coinciding with the orientation of the collection roller track 46, that is to say being oriented toward the left instead of the right in FIG. 1a, the collection roller track 46 and the collection deflection device 47 may be dispensed with, wherein the delivery devices 45 guide the rolling packaging units 10 onward directly to the storage removal roller track 42.

The storage receiving roller track 32 in FIG. 1 is schematically illustrated such that the rolling packaging units 10 are infed to the storage installation 1 from right to left, while the storage removal roller track 42 is illustrated such that the rolling packaging units 10 are discharged from the storage installation 1 from left to right. In one variant of embodiment it may be achieved for example by the arrangement of the storage removal roller track 42 illustrated above that the rolling packaging units 10 are discharged from the storage installation 1 from right to left. This may be of advantage in a warehouse building in which one side of the warehouse building is adapted for inward delivery of goods and an opposite side is adapted for outward delivery of goods, so that the inward delivery and outward delivery areas are completely separated from one another and do not mutually interfere. In one variant the inward delivery area of the warehouse building is disposed so as to be above the outward delivery area, wherein the rolling packaging units 10 are discharged in the same direction from which they are infed to the warehouse installation 1, as is illustrated in FIG. 1.

Furthermore, a detection device 61, a return turnout 62, and a transport device 60 are schematically illustrated in FIG. 1. The detection device and the return turnout 62 are attached to the storage removal roller track 42. The return or transport device, respectively, is attached between the storage removal roller track 42 and the storage receiving roller track 32. The detection device 61 and the return turnout 62 are in particular connected in terms of signaling to the control device 50 illustrated in FIG. 1. The detection device 61 comprises, for example, an optical detector for detecting optical codes, such as, for example, color codes, bar codes, 2D codes, etc., and/or a wireless detector for detecting codes which are stored in RFID tags which are attached to a rolling packaging unit 10 which is located in the effective range of the detection device 61. After a code of the rolling packaging unit 10 has been detected, this code is transmitted to the control device 50 and there checked as to whether a desired rolling packaging unit 10 is located in the storage removal roller track 42. If this check confirms that an undesired rolling packaging unit 10 is located in the storage removal roller track 42, the return turnout 62 is activated by the control device 50, wherein the undesired rolling packaging unit 10 is guided onward from the storage removal roller track 42 to the transport device 60. The transport device 60 is adapted for receiving the undesired rolling packaging unit 10 and for returning it to the storage receiving roller track 32. A multiplicity of plates, which are disposed on a schematically illustrated belt of the transport device 60, which revolves in a vertical and continuous manner and is driven by a motor M, are schematically illustrated in FIG. 1. The undesired packaging unit 10 is guided via the return turnout 62 to such a plate of the transport device 60, then transported upward in a vertical direction and finally guided onward to the storage receiving roller track 32. The respective rolling packaging unit 10 is thus guided back to the warehousing installation 1 and will be available again at a later point in time for removal from storage by the storage removal device 40.

Various reasons as listed below may be considered for such a return.

A high filling density of the storage device 20 may be achieved when the storage stacks 21 are filled in a mixed or even random manner with two or more different types of rolling packaging units 10. This may be meaningful in particular in the event of the various types of rolling packaging units 10 being of approximately identical frequency, that is to say when the quantities of the various types of rolling packaging units 10 are not substantially different from one another or are identical. During discharging of rolling packaging units 10 the undesired types are returned until a rolling packaging unit 10 of the desired type is located in the storage removal roller track 42.

If the storage removal device 40 is actuated in rapid succession, for example, this may cause the sequence of the rolling packaging units 10 in the storage removal roller track 42 to be undesirably mixed up, this being correctable by returning as described.

If a rolling packaging unit 10 is received for storage in a wrong storage stack 21, for example due to an error in actuating corresponding selection devices of the storage receiving device 30, removal from storage of the respective undesired rolling packaging unit 10 may be corrected by returning as described.

However, it is conceivable that returning is not performed but that it is only detected in the control device 50 that an error in the arrangement of rolling packaging units 10 in the storage removal roller track 42 has occurred, wherein this error is corrected in a subsequent processing step, for example while switching a turnout which is controlled by the control device 50.

Figure 9:
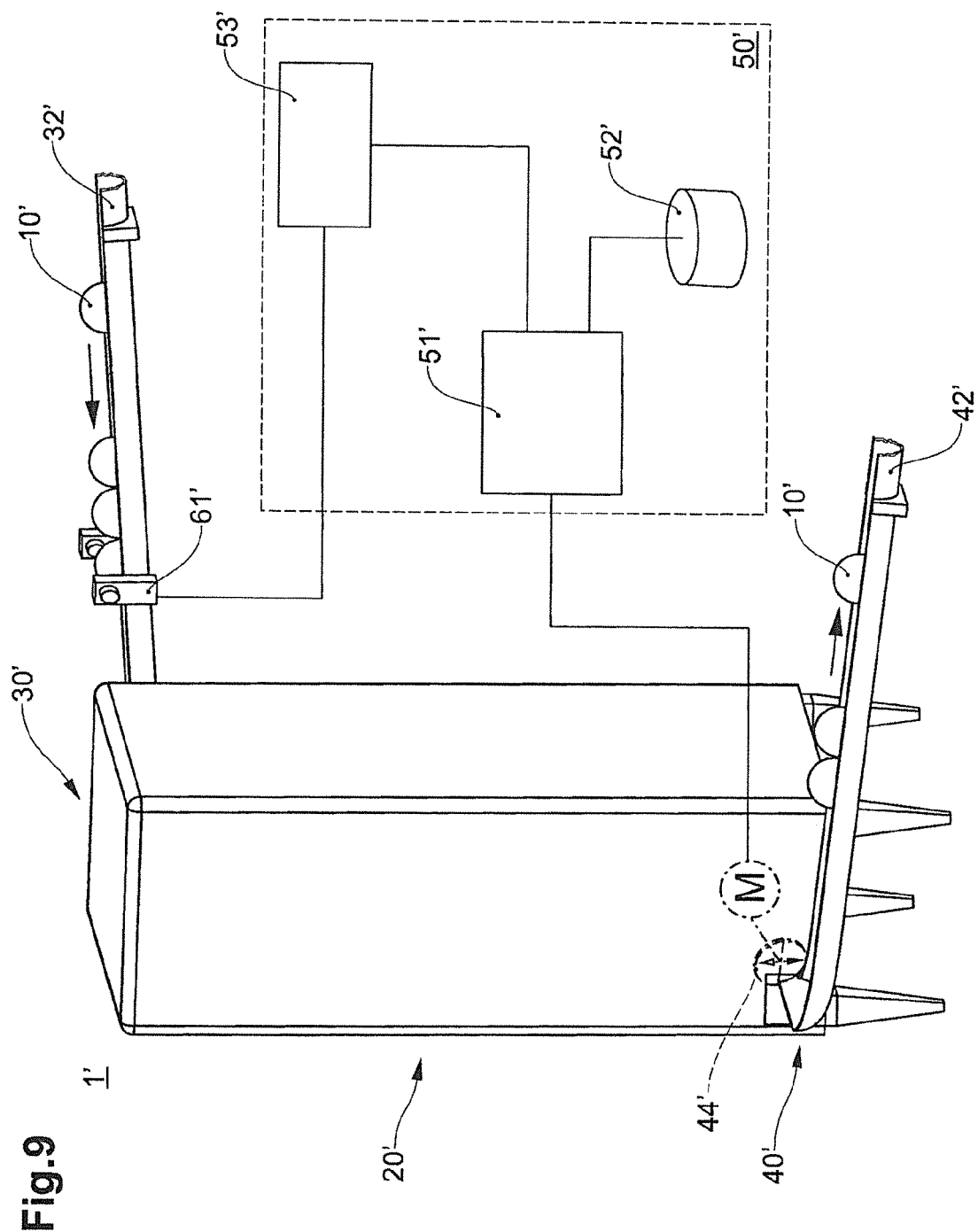
FIG. 9 shows a further embodiment of a warehousing installation according to the invention, with an ashlar-formed storage silo.

FIG. 9 schematically shows a further embodiment of a warehousing installation 1' to which rolling packaging units 10' are infed on a storage receiving roller track 32' and from which such rolling packaging units 10' are discharged on a storage removal roller track 42'. The warehousing installation 1' has a storage silo 20' which is configured so as to be substantially ashlar-shaped and has an interior space for storing rolling packaging units 10', which is substantially ashlar-shaped. The storage receiving roller track 32' in an upper region of the storage silo 20' leads into the latter and thus forms the storage receiving device 30' (which is not separately illustrated in FIG. 9). The storage receiving device in this simplest form is configured as an opening which is installed in the ashlar-shaped storage device 20' and through which the rolling packaging units 10' are guided into the ashlar-shaped interior space of the silo. The storage removal roller track 42' leads away from a storage removal device 40' which is configured in a lower region of the storage device 20'. The storage removal device 40' substantially comprises an opening of the storage device 20', which is closable by a storage slide 44'. In the case of an opened storage slide 44', rolling packaging units 10' are discharged in the storage removal track 42' from the storage device 20'.

When receiving for storage rolling packaging units 10' in the storage device 20 which is illustrated in FIG. 9, the rolling packaging units in the ashlar-shaped interior space of the storage receiving device 32 accumulate on the base of the storage device, or on the rolling packaging units which are already contained in the storage device 20, respectively, with corresponding accelerations arising. Accordingly, the rolling packaging units must be embodied in a sufficiently robust manner in order to survive such accelerations without damage. The rolling packaging units 10 have an external casing, for example, which is slightly elastically deformable in order for such accelerations to be compensated for. Additionally, the base of the storage device 20 may have a slightly deformable mat which, however, will hardly have any effect once a few layers of rolling packaging units 10 are already present in the storage device 20.

As can be seen from FIG. 9, a control device 50', in particular for controlling the storage removal device 40' or the respective storage slide 44', is provided. The control device 50' comprises a computer system 51', a data memory 52' and a detection device interface 53'. A detection device 61' is connected to the detection device interface 53' in terms of signaling. The detection device 61' is disposed on the storage receiving roller track 32', for detecting rolling packaging units 10', for example in order to monitor the filling level of the storage device 20', wherein the current filling level is a result of the number of infed rolling packaging units 10' minus the number of discharged rolling packaging units 10'.

Figure 10:
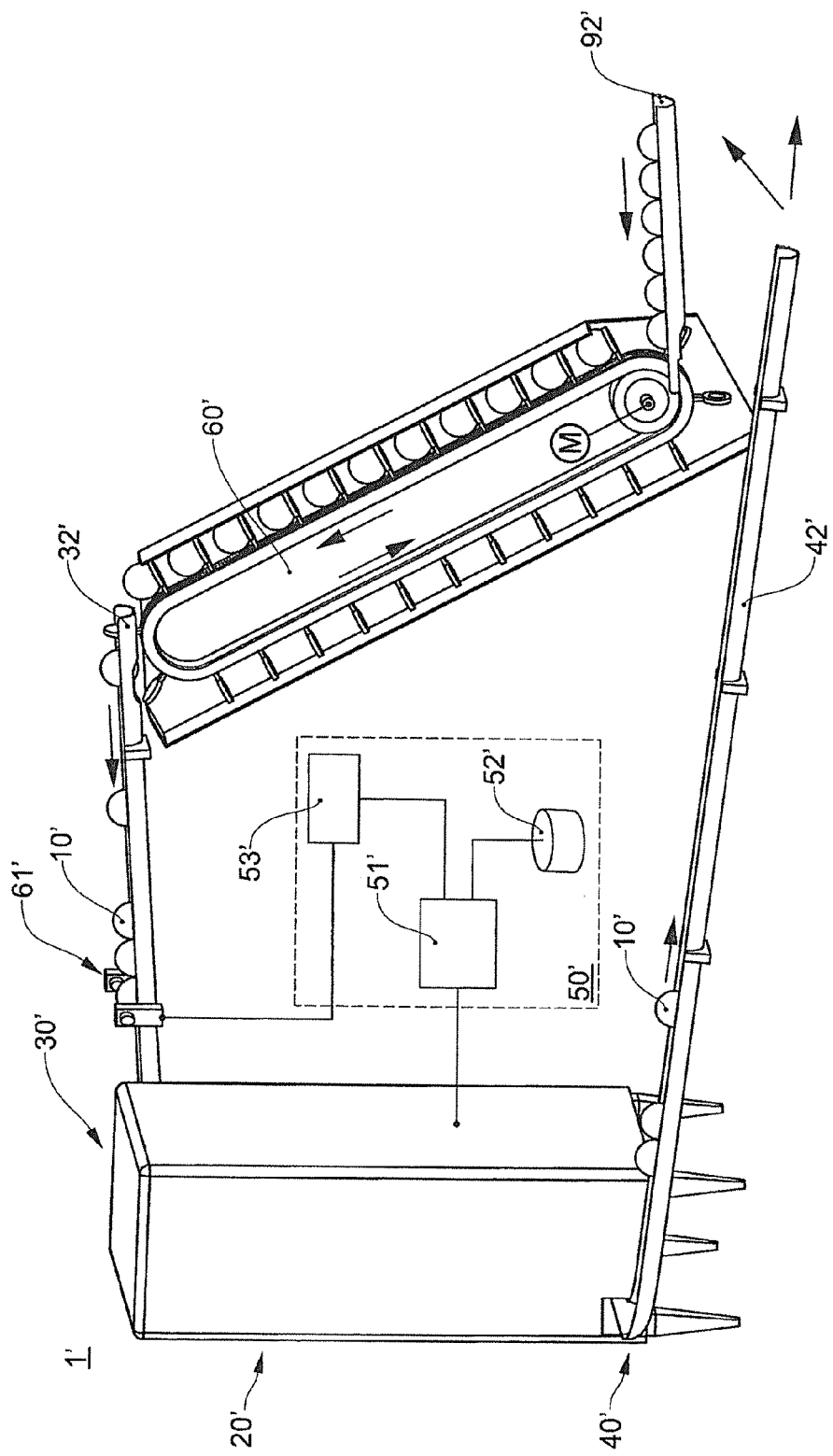
FIG. 10 shows a warehousing installation according to FIG. 9, with a return device.

In relation to FIG. 9, FIG. 10 shows somewhat larger surroundings of a warehousing installation 1'. These surroundings in particular comprise a return device 60'. The return device 60' is interdisposed between a roller track 92' ending at a low level, and a storage receiving roller track 32' starting at a high level. The transport device 60' has a revolving belt which is driven by a motor and on which plates for transporting rolling packaging units 10' from the low level to the high level are provided. As is illustrated in FIG. 10, the transport device 60' may be disposed so as to be sloped so that rolling packaging units 10' during transport may be transported both in the vertical direction as well as in the horizontal direction. The storage receiving transport device 60' in continuous operation may effect transportation of rolling packaging units 10' from the low to the high level in a completely autonomous manner. Alternatively, the operation of the transport device 60' may be controlled by the control device 50'. Overfilling of the storage device 20' may be prevented in particular by stopping the transport device 60'. In the event of the storage device 20' being full, the storage receiving roller track 32' is subsequently likewise filled with rolling packaging units. As soon as the storage receiving roller track 32' would also be full, the rolling packaging units 10' which are transported by the transport device 60' could no longer be accommodated and would fall down. This may be prevented by stopping the transport device 60'. However, a backlog of rolling packaging bodies will form on the roller track 92', which backlog may however be limited or be decreased by measures such as, for example, alternative warehousing installations which are adapted for receiving rolling packaging units 10' from the roller track 92'.

Figure 11:
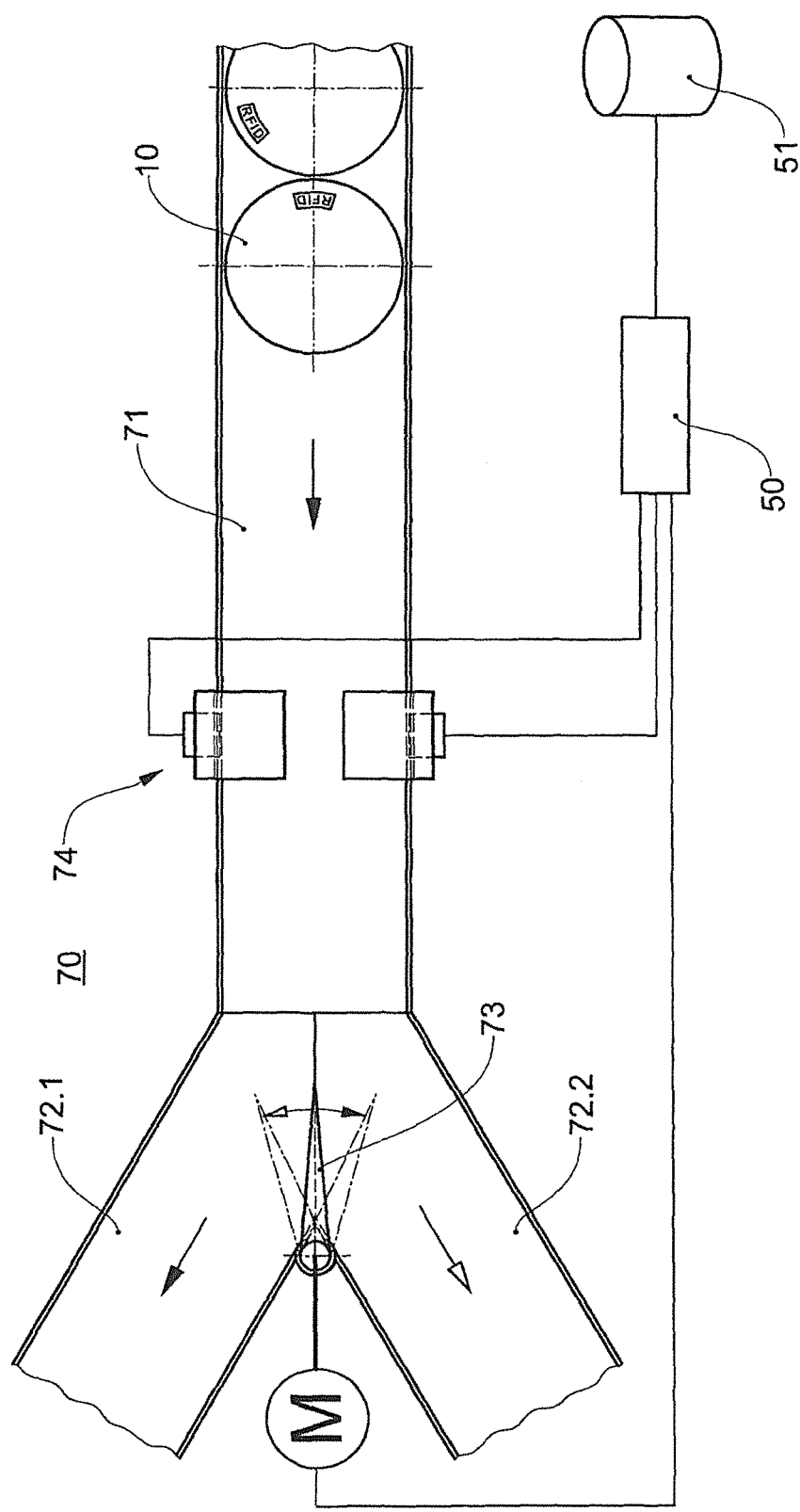
FIG. 11 shows a selection device in a schematic view from above.
Figure 12:
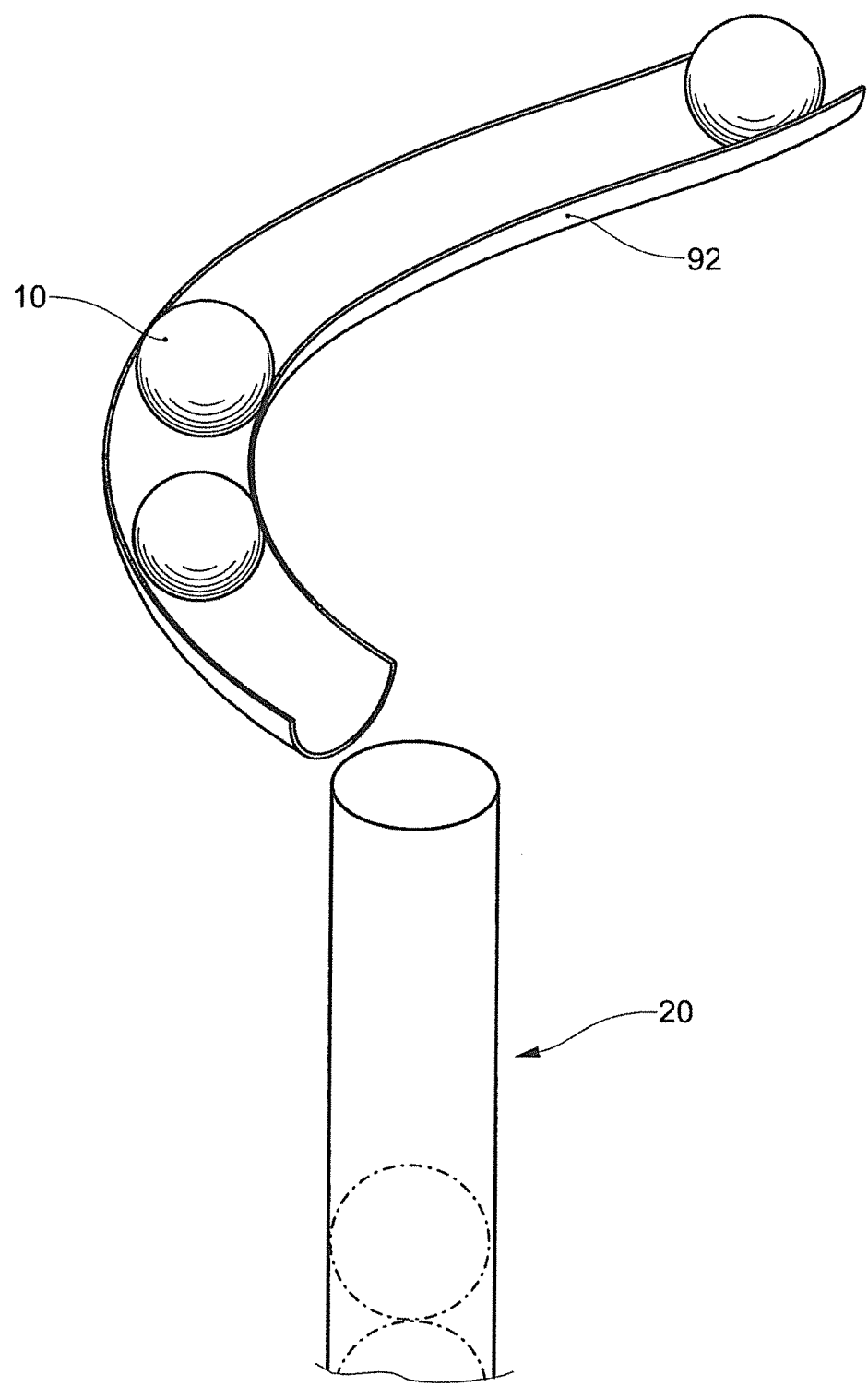
FIG. 12 shows in each case a portion of a curved roller track and an adjoining tube-shaped storage device which is vertically disposed.

FIG. 11 shows a selection installation 70 which is substantially configured as a turnout. An entry track 71 is configured for receiving rolling packaging units 10. A first exit track 72.1 and a second exit track 72.2 adjoin the entry track 71. The selection device 70 is adapted for handing over a received rolling packaging unit 10 either to the first exit track 72.1 or to the second exit track 72.2. Any roller track on which rolling packaging units 10 roll along may adjoin the entry track 71. Any further roller tracks on which rolling packaging units 10 roll away may adjoin the first and second exit track 72.1 and 72.2. As is schematically illustrated in FIG. 12, the selection device 70 comprises a positioning flap 73 which may be positioned in a first position so as to vacate the path for a rolling packaging unit 10 from the entry track 71 to the first exit track 72.1 and to block the path to the second exit track 72.2. As is schematically illustrated in FIG. 11, the positioning flap 73 may be positioned in a second position so as to vacate the path for a rolling packaging unit 10 from the entry track 71 to the second exit track 72.2 and to block the path to the first exit track 72.2. The positioning flap 73 in the illustrated position stops the rolling packaging units rolling along, since the former in this central position does not vacate either of the two exit tracks.

As is schematically illustrated in FIG. 11, the positioning flap 73 is driven by a motor M, for example by an electric motor. Of course, hydraulic, pneumatic, or any other drives are conceivable.

In a refinement of the selection installation 70 schematically illustrated in FIG. 11, an arbitrary number of exit tracks, for example three, four, eight, or any other number, are provided instead of only two.

As is schematically illustrated in FIG. 11, a detection device 74 for detecting a color code, a bar code, a code of an RFID tag, etc., of a rolling unit 10 which is located on the entry track may be provided. As is the case in FIG. 11, the detection device 74 is connected to a control device 50, wherein detected codes are transmitted from the detection device 74 via a wired or wireless communication connection to the control device 50. The received codes are evaluated in the control device 50, for example compared with codes or rules which are filed in a data memory 52. The control device 50 is adapted for positioning the positioning flap 73 in a required position by corresponding actuation of the motor M, so as to transfer the rolling packaging unit 10 either to the first or to the second exit track 72.1, 72.2. Preferably, optical or electrical codes of the respective rolling packaging units are detected in a non-contacting manner. In the event of RFIDs or similar identification features being used, said codes may be passive or active.

FIG. 12 schematically shows a roller track 92 and a tubular storage device 20 which is adjacent thereto and vertically disposed. The roller track 92 terminates at the entry opening of the storage device 20. Rolling packaging units 10 which roll along on the roller track 92 are transferred to the vertically disposed and tubular storage device 20 and stored therein. The vertically disposed and tubular storage device 20 may be disposed in a matrix-like arrangement having such tubular storage devices, wherein filling of the individual vertically disposed and tubular storage devices may be performed by relative movement between the matrix-like arrangement and the roller track 92. As is schematically illustrated in FIG. 12, the roller track 92 has a curved shape of 90°, for example, so that rolling packaging units 10 may be infed from a required or desired side to the vertically disposed and tubular storage device 20. For example, the vertically disposed and tubular storage device 20 for reasons of construction is only accessible from one side which would not coincide with the orientation of a roller track 92 which is embodied without a curved shape.

Figure 13:
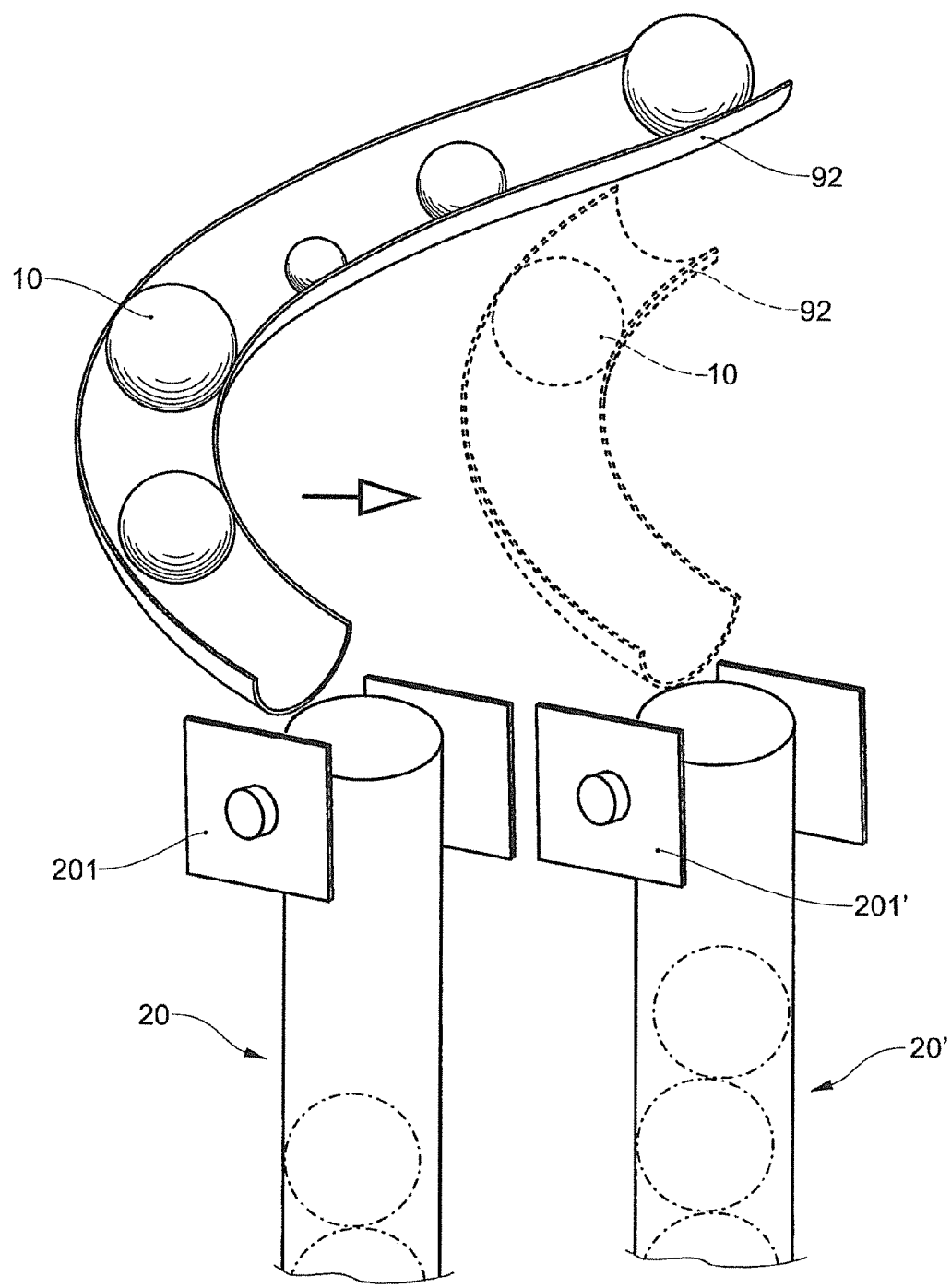
FIG. 13 shows a movable end portion of a roller track for selectively infeeding rolling packaging units to a first or a second storage device, wherein the roller track is indicated in dashed lines in the infeed position above the second storage device.
Figure 14:
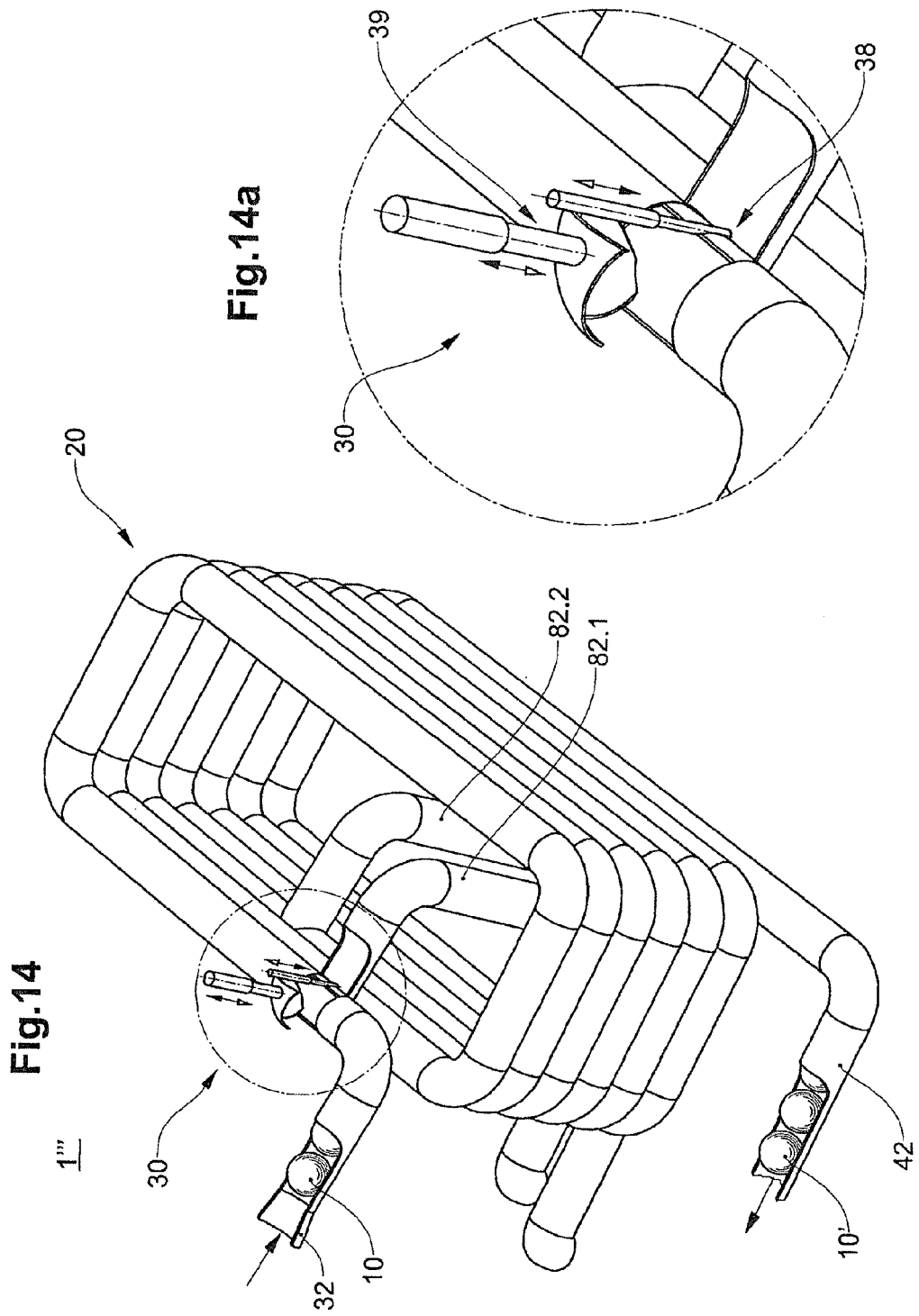
FIG. 14 shows a warehousing installation having a storage device which is embodied in a helical shape.

FIG. 13 schematically shows a roller track 92 and two vertically disposed and tubular first and second storage devices 20, 20', respectively. The tubular storage devices 20, 20' illustrated in FIG. 14 are disposed so as to be stationary, for example in a matrix-like arrangement having a multiplicity of such storage devices. As is schematically illustrated in FIG. 13, the roller track 92 is movably disposed, or is inherently movable, and may be displaced or moved from the position drawn with solid lines to the positioned drawn with dashed lines. In one variant of embodiment, this displacement is triggered based on a control signal of a control installation, for example by activating an adjustment device which comprises an electric motor, a pneumatic drive, a hydraulic drive, etc. By adjusting the position of the roller track 92 a selection whether rolling packaging units 10 which are rolling along in the roller track 92 are handed on to the first tubular storage device 20 or to the second storage device 20' is performed. In this manner, rolling packaging units 10 may be stored in a multiplicity of storage devices which are arranged in a matrix-like manner.

As is illustrated in FIG. 13, a first and second detection device 201, 201' are in each case disposed for example in the entry region of the storage devices 20, 20'. The detection devices 201, 201' are adapted for counting the rolling packaging units 10 which have been transferred from the roller track 92 to the storage devices 20, 20', for example. Furthermore, the detection devices 201, 201' may be adapted for reading a color code, a bar code, a code of an RFID tag, etc., of the rolling packaging unit 10' and for identifying the latter or its packaged content, respectively. Not illustrated in FIG. 13 is a control device to which the number of rolling packaging units or the read codes are transferred, in particular for the purpose of warehouse management, etc.

Only the upper part of a storage device 20, 20' is in each case shown in FIG. 12 and FIG. 13. A storage removal device (not illustrated) is located in the lower part, which storage removal device is adapted for removing from storage the rolling packaging unit first received for storage at a desired point in time and to infeed it to further processing installations on a storage removal roller track.

As opposed to being as illustrated in the description of FIGS. 12 and 13, the vertically disposed and tubular storage devices may be vertically disposed and tubular roller tracks which infeed the rolling packaging units to further processing installations.

FIG. 14 shows a warehousing installation 1''' having a helically embodied storage device 20. Rolling packaging units 10 are infed to the warehousing installation 1''' or to the storage device 20, respectively, on a storage receiving roller track 32. Stored rolling packaging units 10' are discharged from the warehousing installation 1 or the storage device 20, respectively, on a storage removal roller track 42. The storage device 20 has a storage roller track 22 which is disposed in a rectangular helix, which has a plurality of coilings, between a comparatively high level at the storage receiving roller track 32 and a comparatively low level at the storage removal roller track 42. The storage roller track 22 in the variant of embodiment illustrated in FIG. 14 is embodied having a tubular cross section, wherein the tubular storage roller track 22 forms spirals which mutually abut in a vertical direction. The tubular storage roller track 22 within one spiral has a constant slope, for example. On account of the slope in the storage roller track 22, a rolling packaging unit 10 rolls from the storage receiving roller track 32 to the storage removal roller track 42.

The storage device 20 thus has a topmost spiral which is adjoined by lower altitude spirals up to the lowermost spiral. Rolling packaging units 10 are infed from the storage receiving roller track 32 to the storage device 20 in the region of the topmost spiral. Rolling packaging units 10' from the storage device are discharged to the storage removal roller track 42 in the region of the lowermost spiral. One storage receiving device and one storage removal device are provided for infeeding and discharging the rolling packaging units 10, 10'. Of these, only component parts of the storage receiving device 30 are illustrated in FIG. 14, the storage receiving device 30 being illustrated in detail in FIG. 14a.

The storage receiving device 30 according to FIG. 14 comprises a deflection device 39 and a guide device 38, which may be actuated in such a manner that a rolling packaging unit 10 is either guided onward to the storage device 20 or is discharged to a first discharge roller track 82.1. In particular, the deflection device 39 and the guide device 38 are embodied so as to be vertically displaceable, wherein for onward guiding of the rolling packaging unit 10 the deflection device 39 is adjustable to a vertical position above the storage receiving device 30, in which position access to the storage device 20 is vacated, and the guide device 38 is adjustable to a vertical position in front of the first discharge roller track 82, in which position access to the first discharge roller track 82.1 is blocked. In correspondingly alternative positions, access to the storage device 20 is blocked by the deflection device 39, and access to the first discharge roller track 82.1 is vacated by the guide device 38, wherein a corresponding change of direction of the rolling packaging unit 10 is effected by the deflection unit 39.

As is schematically illustrated in FIG. 14, a second discharge roller track 82.2 may be attached to the storage device 20, for example in such a manner that a rolling packaging unit 10 in the storage device 20 initially rolls down a certain distance, for example through one or a plurality of coilings of the rectangular serpentine, before this rolling packaging unit 10 arrives at the second discharge roller track 82.2. In an analogous manner to the deflection device 39 and the guide device 38, described above, a discharge device by way of which it is defined whether the rolling packaging unit 10 is transferred to the second discharge roller track 82.2 or is guided onward in the storage device 20, is attached in the case of the second discharge roller track 82.2, for example.

There are various scenarios in which discharging a rolling packaging unit 10 to the second discharge roller track 82.2 is considered.

Post-checking of the rolling packaging unit 10 in the storage device 20, which is performed, for example, using a corresponding detection device (not illustrated in FIG. 14) concludes that said rolling packaging unit 10 has been erroneously guided into this storage device 20. On account thereof, the consistency of the rolling packaging units 10 stored in the storage device 20 may be improved.

Dynamic reconfiguring of the warehousing system for which the warehousing installation 1''' has been provided, concludes that specific rolling packaging units 10 are no longer to be stored in the respective storage device 20 and are to be discharged therefrom. Such dynamic reconfiguring may be a result of inward delivery and/or outward delivery of goods and, for example, may be based on the feet that rolling packaging units 10 having a specific packaged content are to be stored only in smaller quantities for which a warehousing installation of a different type is more suitable.

Figure 15:
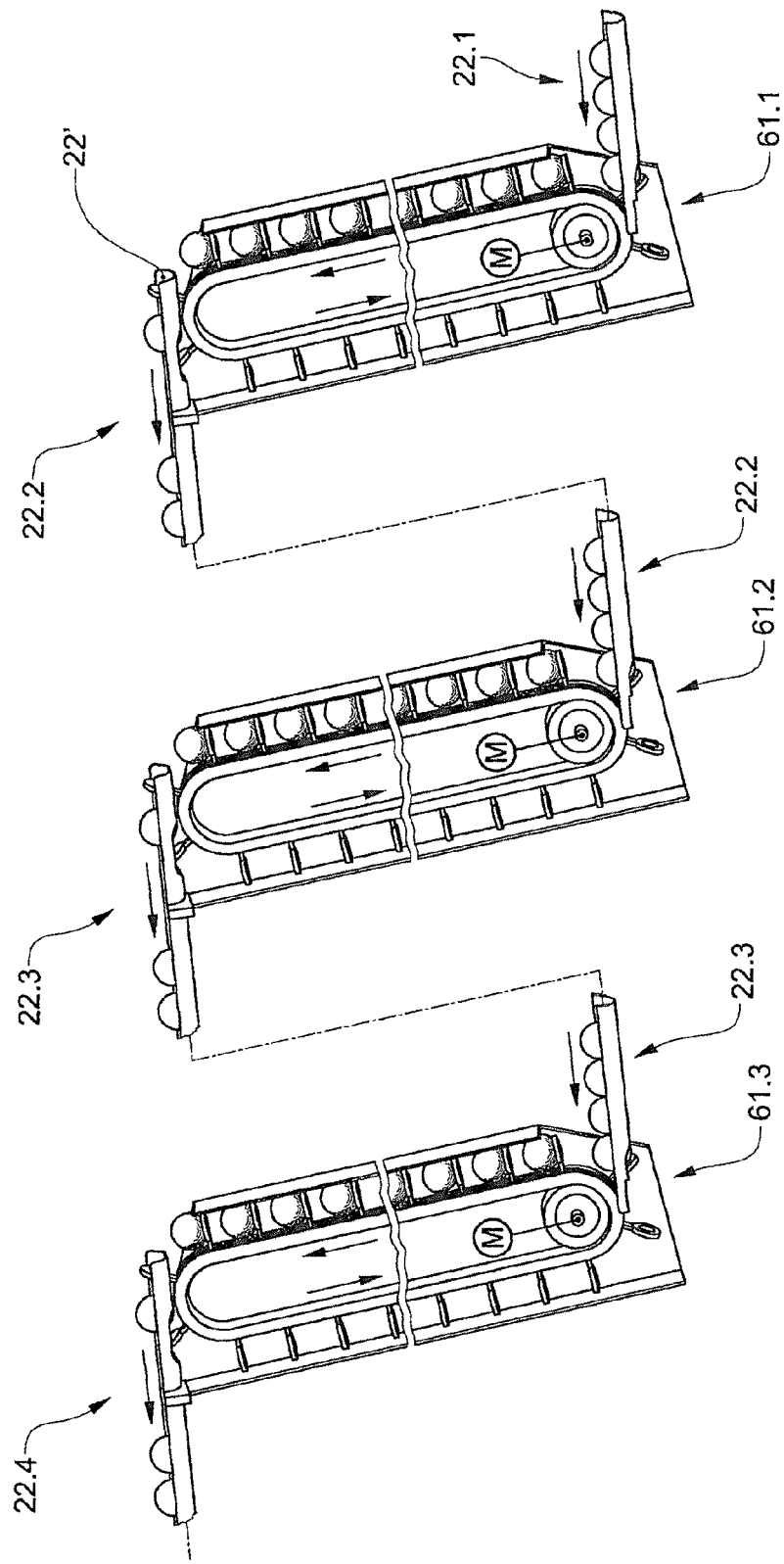
FIG. 15 shows a schematic side view of a roller track comprising a plurality of portions having interdisposed lifting devices, wherein in each case the start and end regions of the portions are drawn and the interdisposed regions are illustrated in a shortened and dashed line.

A schematic side view of part of an assembled roller track 22' for transporting rolling packaging units across a comparatively large distance is shown in FIG. 15. The roller track 22' comprises a plurality of portions 22.1 to 22.4, having interdisposed lifting devices 61.1 to 61.3, wherein the start and end regions of the portions 22.2 and 22.3 are in each case drawn and the interdisposed regions are illustrated in a shortened and dashed manner. The lifting devices substantially correspond to the transport devices 60; which have already been described with reference to FIG. 10 and are again drivable by means of motors M. In the illustrated embodiment the rolling packaging units move in the direction of the arrow on a first portion 22.1 of the roller track 22' toward an end region at which the first lifting device 61.1 is disposed. Said rolling packaging units are acquired by the latter in the manner previously described, lifted, and handed over to the second roller track portion 22.2. The rolling packaging units roll along the slope of the latter up to the second lifting device 61.2, where they are lifted individually in sequence and are handed over to the next roller track portion. It remains to be noted that such an assembled roller track 22' having interdisposed lifting devices may be very advantageously employed for transporting rolling packaging units across comparatively large and large distances and may also be implemented independently of the warehousing installations and systems according to the invention. In order for the rolling packaging units to be able to be lifted to a higher level, screw conveyors, conveying wheels, grippers, or other devices, which permit efficient lifting of the rolling packaging units may also be used besides the lifting and transport devices which have previously been shown.

Figure 16:
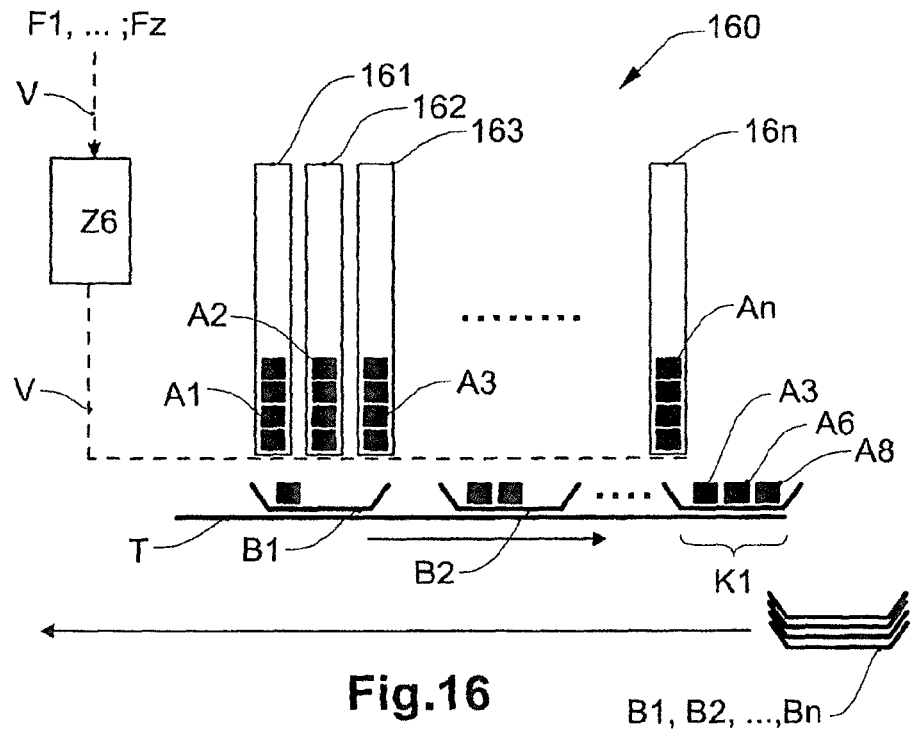
FIG. 16 schematically shows a side view of a picking robot.

FIG. 16 schematically shows a side view of a picking robot 160 as is known from the prior art. A number of n warehousing shafts 161, 162, 163, . . . , 16n are disposed along a transport belt T. Each of the warehousing shafts 161, 162, 163, . . . , 163n is provided for warehousing in each case a plurality of identical articles of a product line comprising a number of n articles A1, A2, A3, . . . , An.

According to FIG. 16, a plurality of first articles A1 are disposed in a first warehousing shaft 161, a plurality of second articles A2 are disposed in a second warehousing shaft 162, etc. The articles A1, A2, A3, . . . , An are in each case contained in a box, an item of packaging, etc., for example.

A number of m picking containers B1, B2, . . . , Bm are disposed on the transport belt T. The transport belt T is driven so that the picking containers B1, B2, . . . , Bm are moved past the warehousing shafts 161, 162, 163, . . . , 16n.

A central controller Z6 is adapted for detecting a number of z picking orders F1, . . . , Fz and position data of the picking containers B1, B2, . . . , Bm in relation to the warehousing shafts 161, 162, 163, . . . , 16n. Furthermore, the central controller Z6 is adapted for transmitting release signals to the releasing devices of the warehousing shafts 161, 162, 163, . . . , 16n, which are based on and correspond to the detected picking orders F1, . . . , Fz and position data. Upon receipt of a release signal, an article A1, A2, A3, . . . , An is handed over from the respective warehousing shaft 161, 162, 163, . . . , 16n to the corresponding picking container B1, B2, . . . , Bm. The picking containers B1, B2, . . . , Bm are filled with articles A1, A2, A3, . . . , An from the warehousing shafts 161, 162, 163, . . . , 16n, and picking lots K1, . . . , Kz are formed in the picking containers B1, B2, . . . , Bm.

A picking lot K1, . . . , Kz which, as has been mentioned, is based on a picking order F1, . . . , Fz, comprises an article A1, A2, A3, . . . , An, or one or a plurality of identical or different articles A1, A2, A3, . . . , An in an arbitrary number.

The central controller Z6 comprises, for example, a commercially available computer having correspondingly adapted interfaces so as to detect picking orders F1, . . . , Fz and position data of the picking containers B1, B2, . . . , Bm, and so as to transmit release signals to releasing devices of the warehousing shafts 161, 162, 163, . . . , 16n. Data and/or signal connections V, which are connected to the mentioned interfaces of the central controller Z6, are indicated with dashed lines in FIG. 16. The data and/or signal connections V are adapted for the transmission of the mentioned data and/or signals.

A first picking order F1 requires that a first picking lot K1 is formed from the warehoused articles A1, A2, A3, . . . , An. As an example, a first picking lot K1 which comprises the articles with the reference signs A3, A6, A8 is illustrated in FIG. 16. The first picking lot K1 is disposed in the picking container with the reference sign Bm. As mentioned, the picking order F1 may require only a single article A1, A2, A3, . . . , An or one or a plurality of articles A1, A2, A3, . . . , An in a specific number and in a specific composition. In contrast to the picking device according to the invention which will be described hereunder, the numbers and the composition are limited by the size of the articles A1, A2, A3, . . . , An and/or the size of the picking containers B1, B2, . . . , Bm.

Following the picking robot 160, the picking containers B1, B2, . . . , Bm which have been filled according to the picking orders F1, . . . , Fz are infed to further processing installations, for example a packing station, in order for the picking lots K1, . . . , Kz which are contained in the picking containers B1, B2, . . . , Bm to be packed in each case in one parcel. The parcels may be provided for delivery to vendors or final customers and may be handed on to a forwarding service or a postal service. The emptied picking containers B1, B2, . . . , Bm may be infed to the picking robot 160 again for reuse.

The picking robot 160 requires energy in order to drive the transport belt T, for example electric energy for operating an electric motor. The reuse of emptied picking containers B1, B2, . . . , Bm likewise requires the supply of energy, for example for driving a corresponding transport carriage. The operation of the central controller Z6 and the actuation of the releasing devices of the warehousing shafts 161, 162, 163, . . . , 16n likewise require energy. The transport belt T comprises moving parts and regular maintenance work is required.

Figure 17:
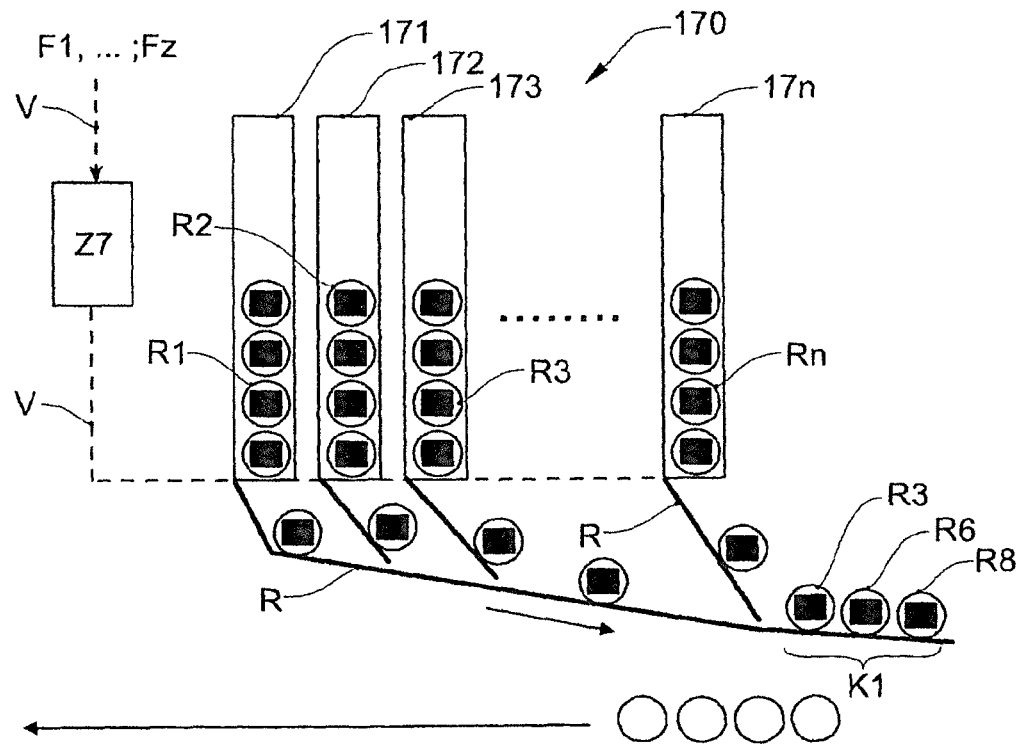
FIG. 17 schematically shows a side view of a picking arrangement according to the invention.

FIG. 17 schematically shows a side view of a picking device 170 according to the invention. A number of n warehousing shafts 171, 172, 173, . . . , 17n are disposed along a sloped roller track R. Each of the warehousing shafts 171, 172, 173, . . . , 17n is provided for warehousing in each case a plurality of rolling bodies R1, R2, R3, . . . , Rn, which in each case contain one article. As opposed to the picking robot 160, not articles A1, A2, A3, . . . , An are warehoused, but rolling bodies R1, R2, R3, . . . , Rn, in which in each case for example one article is disposed, are warehoused.

According to FIG. 17, a plurality of first rolling bodies R1 are disposed in a first warehousing shaft 171, a plurality of second rolling bodies R2 are warehoused in a second warehousing shaft 172, etc. A first article A1 may in each case be disposed in the first rolling body R1. A second article A2 may in each case be disposed in the second rolling body R2, etc.

A central controller Z7 is adapted for detecting a number of z picking orders F1, . . . , Fz. Based on the detected picking orders F1, . . . , Fz, the central controller Z7 is furthermore adapted for transmitting corresponding release signals to releasing devices of the warehousing shafts 171, 172, 173, . . . , 17n, wherein in each case one rolling body R1, R2, R3, . . . , Rn is handed over from the corresponding warehousing shaft 171, 172, 173, . . . , 17n to the sloped roller track R for onward rolling. The release signals are mutually coordinated and picking lots K1, . . . , Kz are formed by rolling bodies R1, R2, R3, . . . , Rn. A picking lot K1, . . . , Kz with rolling bodies R1, R2, R3, . . . , Rn corresponds to a picking lot of the articles A1, A2, A3, . . . , An which are disposed in the rolling bodies R1, R2, R3, . . . , Rn.

A picking lot K1, . . . , Kz which, as mentioned, is based on a picking order F1, . . . , Fz, comprises a rolling body R1, R2, R3, . . . , Rn or one or a plurality of identical or different rolling bodies R1, R2, R3, . . . , Rn in an arbitrary number. A picking lot of articles results according to the articles A1, A2, A3, . . . , An which are disposed in the rolling bodies R1, R2, R3, . . . , Rn.

The central controller Z7 comprises, for example, a commercially available computer having correspondingly adapted interfaces so as to detect picking orders F1, . . . , Fz and to transmit release signals to releasing devices of the warehousing shafts 171, 172, 173, . . . , 17n. Data and/or signal connections V, which are connected to the mentioned interfaces of the central controller Z7, are indicated with dashed lines in FIG. 17. The data and/or signal connections V are adapted for the transmission of the mentioned data and/or signals.

A first picking order F1 requires that a desired first picking lot K1 of rolling bodies R1, R2, R, . . . , Rn and thus of the articles A1, A2, A3, . . . , An which are disposed therein is formed from the rolling bodies R1, R2, R3, . . . , Rn. As an example, a first picking lot K1 which comprises the rolling bodies R3, R6, R8, and thus the articles A3, A6, A8, is illustrated in FIG. 17. The rolling bodies R3, R6, R8 successively roll on the roller track R. A picking order F1, . . . , Fz may require that the respective rolling bodies R1, R2, R3, . . . , Rn roll in a specific sequence or in an arbitrary sequence on the roller track R.

Following the picking device 170 according to the invention, the picking lots K1, . . . , Kz which have been formed according to the picking orders F1, . . . , Fz, are infed to further processing installations, for example a packing station, in order for the picking lots K1, . . . , Kz which are formed from the rolling bodies R1, R2, R3, . . . , Rn to be packed in each case in one parcel. In one variant the respective articles A1, A2, A3, . . . , An prior to packing are removed from the rolling bodies R1, R2, R3, . . . , Rn. In another variant the rolling bodies R1, R2, R3, . . . , Rn are packed. The parcels may be provided for delivery to vendors or final customers and may be handed on to a forwarding service or a postal service. Emptied rolling bodies R1, R2, R3, . . . , Rn may be infed to the picking device 170 again for reuse.

The rolling bodies R1, R2, R3, . . . , Rn which are disposed in the warehousing shafts 171, 172, 173, . . . , 17n may be filled in a homogenous manner, as has been illustrated above, that is to say that the rolling bodies R1, R2, R3, . . . , Rn per warehousing shaft 171, 172, 173, . . . , 17n may contain only one specific article A1, A2, A3, . . . , An. For example, first rolling bodies R1 in each case contain the first article A1, second rolling bodies R2 in each case contain the second article A2, etc. As illustrated above, in this case the first picking lot K1 which has the rolling bodies R3, R6, R8 and which has been indicated in FIG. 17 corresponds to a picking lot of the articles A3, A6, A8.

Inhomogeneous filling instead of homogenous filling of the warehousing shafts 171, 172, 173, . . . , 17n may be provided. For example, a number k of first rolling bodies R11, R12, R13, R14, R15, R16, . . . , R1k are disposed in the first warehousing shaft 171. Said first rolling bodies are filled with articles A1, A2, A3, . . . , An, according to a first partial picking lot TK1. For example, in this way, the first first rolling body R11 has the first article A1, the second first rolling body R12 has the second article A2, the third first rolling body R13 has the third article A3, the fourth first rolling body R14 again has the first article A1, the fifth first rolling body R15 again has the second article A2, the sixth first rolling body R16 again has the third article A3, etc. A number of first partial picking lots TK1 which in each case are formed from the first, second, and third articles A1, A2, A3 are thus located in the warehousing shaft 171.

Picking of partial lots of articles in the warehousing shafts 161, 162, 163, . . . , 16n is not possible in the case of the abovementioned picking robot 160, since in each case only one single article A1, A2, A3, . . . , An may be handed over from the respective warehousing shaft 161, 162, 163, . . . , 16n to the corresponding picking container B1, B2, . . . , Bm by one warehousing shaft 161, 162, 163, . . . , 16n. However, the picking robot is not adapted for simultaneously handing over a plurality of articles in one step. In order to be able to hand over a plurality of articles A1, A2, A3, . . . , An, stopping of the transport belt T would be required, for example, in order to keep the picking container B1, B2, . . . , Bm in position at the respective warehousing shaft 161, 162, 163, . . . , 16n during a time period required for handing over a plurality of articles A1, A2, A3, . . . , An.

Picking of partial lots enables frequently required compositions of articles from the warehouse to be made available in one step. In one variant, picking of partial lots corresponds to a picking order F1, . . . , Fz and thus to a picking lot K1, . . . , Kz. No further steps apart from the handover of the corresponding rolling bodies R1, R2, R3, . . . , Rn from the respective warehousing shaft 171, 172, 173, . . . , 17n to the roller track R are necessary. Of course, partial picking lots after handover to the roller track R may be complemented by way of further rolling bodies, in order for a picking order F1, . . . , Fz which comprises not only one partial picking lot to be completed.

The picking device 170 according to the invention, which is shown in FIG. 17, furthermore makes it possible for an existing but not completely conforming partial picking lot to be adapted to a picking order K1, . . . , Kz, using simple measures, in that in the case of a partial picking lot, which is composed of rolling bodies R11, R12, R13 and which has been handed over from a warehousing device 171, 172, 173, . . . , 17n to the roller track R, one of the rolling bodies R11, R12, R13 having an article which does not conform to the order is segregated at a suitable point of the roller track R and in that a rolling body R1, R2, R3, . . . , Rn having an article conforming to the order is added at a respective warehousing shaft 171, 172, 173, . . . , 17n. The segregated rolling body having the article which does not conform to the order may be returned to a warehousing device 171, 172, 173, . . . , 17n having in each case identical rolling bodies R1, R2, R3, . . . , Rn, or be returned together with corresponding further rolling bodies to a warehousing device 171, 172, 173, . . . , 17n having partially picked rolling bodies R11, R12, R13, R14, R15, R16, . . . , R1k for forming a new partially picked lot.

The picking devices according to the invention may have various post-processing devices disposed downstream thereof, for example a sorting installation for modifying the sequence of picked rolling bodies, a correction device for replacing erroneously picked rolling bodies, an intermediate warehousing device for warehousing picked rolling bodies, a route selection device for assigned picked rolling bodies to one of a plurality of delivery routes, a repacking device for removing articles from the picked rolling bodies and repacking them into delivery containers, a return device for returning emptied rolling bodies to the picking device for reuse, etc.

In one embodiment the central controller Z7 is adapted for detecting position data of rolling bodies R1, R2, R3, . . . , Rn. Position data may be detected, for example, by readers which are disposed along the roller track and which in each case read items of information from data carriers which are in each case attached to one rolling body R1, R2, R3, . . . , Rn and which are capable of being externally read. For example, bar code readers or RFID readers, which check for a bar code or an RFID tag of a rolling body R1, R2, R3, . . . , Rn, are disposed thereon. On account of the position of the reader, the position of the detected rolling body R1, R2, R3, . . . , Rn may be determined.

Picking of lots may be monitored by way of detecting the position of the rolling bodies. It may thus be checked whether a picking lot K1, . . . , Kz is complete, when a rolling body R1, R2, R3, . . . , Rn may be infed to a picking lot K1, . . . , Kz, when the roller track R is vacant so as to start a new picking lot K1, . . . , Kz, whether the sequence of the rolling bodies R1, R2, R3, . . . , Rn is correct, etc.

Monitoring of lot picking may also be performed without the position of the rolling bodies R1, R2, R3, . . . , Rn being detected, in that the current position of the rolling bodies R1, R2, R3, . . . , Rn is continuously calculated on the basis of a model and based on the calculated positions it is checked whether a picking lot K1, . . . , Kz is complete, when a rolling body R1, R2, R3, . . . , Rn may be infed to a picking lot K1, . . . , Kz, when the roller track R is vacant so as to start a new picking lot K1, . . . , Kz, whether the sequence of the rolling bodies R1, R2, R3, . . . , Rn is correct, etc.

Figure 18:
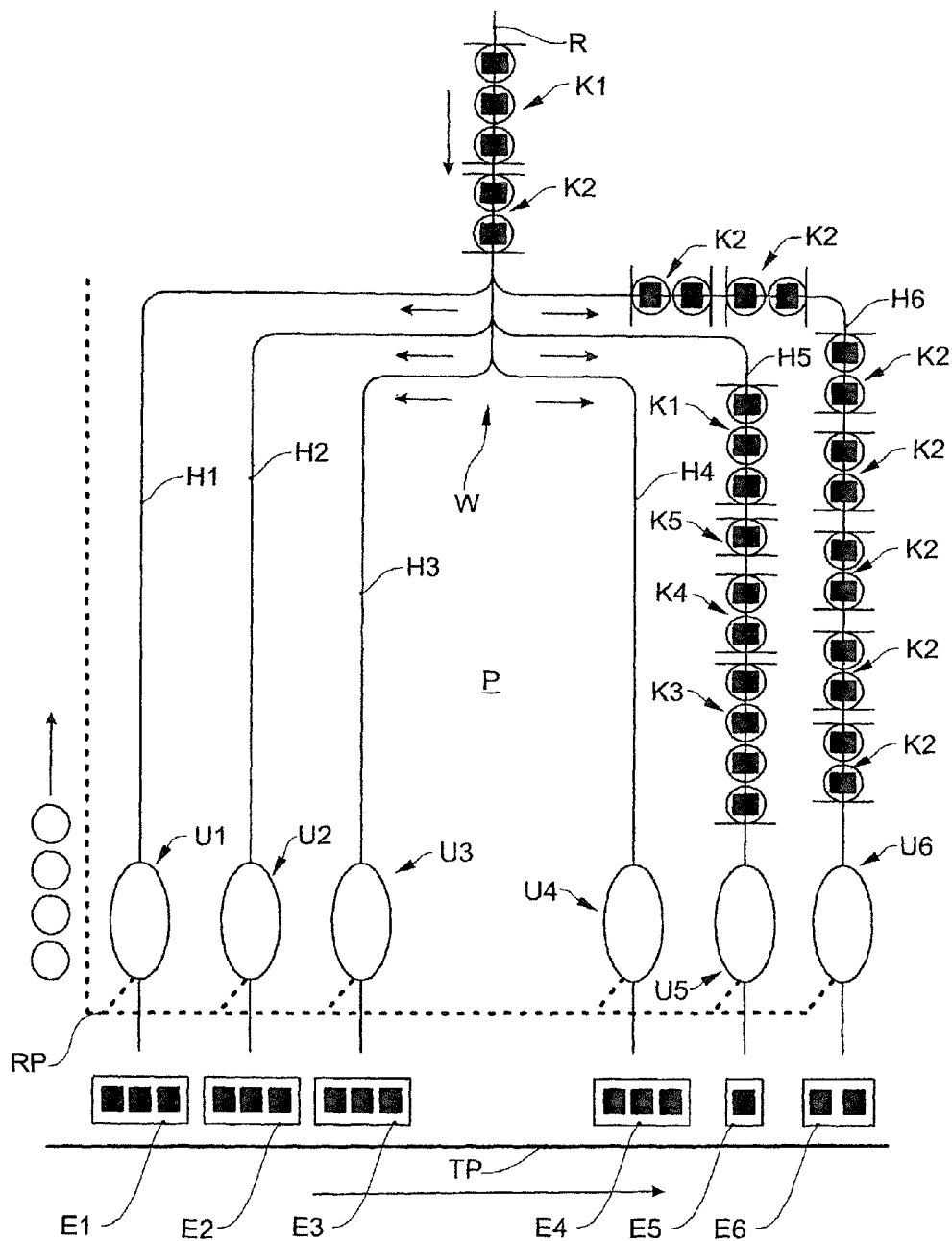
FIG. 18 schematically shows a buffer device which adjoins the picking device.

FIG. 18 schematically shows a buffer device P for buffering picking lots K1, K2, K3, K4, K5, . . . . The buffer device P is followed by a plurality of repacking stations U1, U2, U3, U4, U5, U6, . . . , which are followed by a transport belt TP for transporting parcels E1, E2, E3, E4, E5, E6, . . . . In one variant, the repacking stations U1, U2, U3, U4, U5, U6, . . . are moreover followed by a return path RP for returning emptied rolling bodies.

The buffer device P follows on downstream of the picking device 170. The roller track R which is shown in FIG. 18 is the continuation of the roller track R shown in FIG. 17.

The picking lots K1, K2 which have been formed as described above, on the roller track R are infed to a turnout system W. The roller track R is sloped in the direction of the turnout system W so that the picking lots K1, K2, K3, K4, K5, . . . roll in the direction of the turnout system W without the supply of energy.

The plurality of buffer or repacking roller tracks H1, H2, H3, H4, H5, H6, . . . , which are sloped in the direction of the repacking stations U1, U2, U3, U4, U5, U6, . . . , adjoin the turnout system W. The plurality of buffer roller tracks H1, H2, H3, H4, H5, H6, . . . are adapted for infeeding the picking lots K1, K2, K3, K4, K5, . . . to the repacking stations U, U2, U3, U4, U5, U6, . . . without the supply of energy. The plurality of buffer roller tracks H1, H2, H3, H4, H5, H6, . . . are furthermore adapted for buffering in each case a plurality of picking lots K1, K2, K3, K4, K5, . . . .

As an example, a third picking lot K5, a fourth picking lot K4, a fifth picking lot K5, and a first picking lot K1 are buffered on the fifth buffer roller track H5 of the plurality of buffer roller tracks H1, H2, H3, H4, H5, H6, . . . in FIG. 18.

As an example, a plurality of second picking lots K2 are buffered on the sixth buffer roller track H6 of the plurality of buffer roller tracks H1, H2, H3, H4, H5, H6, . . . in FIG. 18.

The turnout system W is adapted for infeeding the picking lots K1, K2, K3, K4, K5, . . . from the roller track R to the plurality of buffer roller tracks H1, H2, H3, H4, H5, H6, . . . according to a desired procedure. In one variant the desired procedure is controlled by a central controller. In one variant the picking lots K1, K2, K3, K4, K5, . . . are infed to the plurality of buffer roller tracks H1, H2, H3, H4, H5, H6, . . . according to the number of rolling bodies contained in the former. In one other variant the picking lots K1, K2, K3, K4, K5, . . . are randomly infed to the plurality of buffer roller tracks H1, H2, H3, H4, H5, H6, . . . , for example in order to obtain uniform utilization of the plurality of buffer roller tracks H1, H2, H3, h4, H5, H6, . . . . In one further variant the picking lots K1, K2, K3, K4, K5, . . . are infed to the plurality of buffer roller tracks H1, H2, H3, H4, H5, H6, . . . based on information relating to urgency.

The plurality of buffer roller tracks H1, H2, H3, H4, H5, H6, . . . are adapted for enabling suitable buffering. In this way, the plurality of buffer roller tracks H1, H2, H3, H4, H5, H6, . . . may have loops, coilings, etc., in order to buffer a large number of picking lots K1, K2, K3, K4, K5, . . . . On account thereof, a temporarily high volume of picking lots K1, K2, K3, K4, K5, . . . may be buffered and be processed by a limited number of repacking stations U1, U2, U3, U4, U5, U6, . . . .

Manual, semi-automatic, or fully automatic repacking of the rolling bodies into parcels E1, E2, E3, E4, E5, E6, . . . is performed at the repacking stations U1, U2, U3, U4, U5, U6, . . . . Manual repacking is performed exclusively by operators. Semi-automatic repacking is performed by operators who are supported by a repacking device. Fully automatic repacking is performed by a repacking device without operator collaboration.

During repacking each picking lot K1, K2, K3, K4, K5, . . . may be packed into one or into a plurality of parcels E1, E2, E3, E4, E5, E6. The rolling bodies of the picking lots K1, K2, K3, K4, K5, . . . may be packed directly into the parcels E1, E2, E3, E4, E5, E6, or the articles may be removed from the rolling bodies and be packed into the parcels E1, E2, E3, E4, E5, E6, wherein the emptied rolling bodies are returned for reuse via a return path RP.

At the repacking stations the parcels E1, E2, E3, E4, E5, E6 are disposed on a transport belt TP for onward transport. Subsequent to the transport belt TP the parcels E1, E2, E3, E4, E5, E6 are handed over to a postal service, a forwarding service, etc.

According to further embodiments (not illustrated in the figures), one or a plurality of connection roller tracks are interdisposed between the buffer roller tracks H1, H2, H3, H4, H5, H6, . . . . The connection roller tracks are adapted for handing over picking lots K1, K2, K3, K4, K5, . . . from a first buffer roller track H1, H2, H3, H4, H5, H6, . . . to a second buffer roller track. This allows that picking lots K1, K2, K3, K4, K5, . . . may be prioritized for processing or that errors in the picking lots K1, K2, K3, K4, K5, . . . may be corrected, for example. The connection roller tracks may have a sorting device, for example, in order for the sequence of the rolling bodies of a picking lot K1, K2, K3, K4, K5, . . . to be modified. The connection roller tracks may have adding or segregating installations, in order for additional rolling bodies to be added to a picking lot K1, K2, K3, K4, K5, . . . or to be segregated therefrom. A plurality of connection roller tracks may be interdisposed between two buffer roller tracks H1, H2, H3, H4, H5, H6, . . . , for example in order for a picking lot K1, K2, K3, K4, K5, . . . to be handed over from an entry region of a first buffer roller track H1, H2, H3, H4, H5, H6, . . . to an entry or exit region of a second buffer roller track H1, H2, H3, H4, H5, H6, . . . .

The invention claimed is:

1. A warehousing installation for a multiplicity of rolling packaging units which are configured as rollable bodies, the warehousing installation comprising:
    at least one storage device for storing a plurality of rolling packaging units,
    a storage receiving device for receiving a rolling packaging unit and for feeding this rolling packaging unit to the storage device,
    a storage removal device for discharging in a rolling manner a rolling packaging unit stored in the storage device as a rolling-away rolling packaging unit,
    a control device for controlling the storage removal device, and
    a transport device for returning to the storage receiving device a rolling packaging unit which is rolling away from the storage removal device.

2. The warehousing installation as claimed in claim 1, wherein the rolling packaging units have a round shape, a spherical shape, a polyhedral shape, or a cylindrical spatial shape.

3. The warehousing installation as claimed in claim 1, wherein the storage device comprises at least one of the following devices: a storage roller track, a storage floor, a storage shaft, a storage silo.

4. The warehousing installation as claimed in claim 1, wherein the storage device comprises a storage roller track which includes at least one of the following devices: a railway, a channel, a tube.

5. The warehousing installation as claimed in claim 1, wherein the storage device comprises a multiplicity of tubes in the form of tube stacks.

6. A warehousing installation for a multiplicity of rolling packaging units which are configured as rollable bodies, the warehousing installation comprising:
    at least one storage device for storing a plurality of rolling packaging units,
    a storage receiving device for receiving a rolling packaging unit and for feeding this rolling packaging unit to the storage device,
    a storage removal device for discharging in a rolling manner a rolling packaging unit stored in the storage device as a rolling-away rolling packaging unit, and
    a control device for controlling the storage removal device,
    wherein the storage receiving device is designed to at least one of receive rolling packaging units from a storage receiving roller track, and discharge rolling packaging units in a rolling manner to a storage removal roller rack.

7. The warehousing installation as claimed in claim 1, comprising a multiplicity of rolling packaging units which are configured as rollable bodies, and/or a multiplicity of goods and/or goods containers which are in each case provided with means that allow rolling.

8. A method for operating a warehousing installation as claimed in claim 1, wherein the rolling packaging unit is conveyed in at least one of a rolling manner, propelled by gravity, in a storage receiving device, a storage device and a storage removal device, rolls away from the storage removal device, and is returned to the storage receiving device.

9. A warehousing system comprising a plurality of warehousing installations as claimed in claim 1, wherein rolling packaging units are feedable to and/or dischargeable from the warehousing installations via one or a plurality of roller tracks, in particular are feedable to at least one warehousing installations via at least one storage receiving roller track and/or are dischargeable from one or a plurality of warehousing installations via at least one storage removal roller track.

10. The warehousing system as claimed in claim 9, comprising a plurality of roller tracks and at least one selection installations for defining on which of the plurality of roller tracks the packaging unit is to move in a rolling manner.

11. The warehousing system as claimed in claim 9, comprising at least one transport installations for transporting in a non-rolling manner rolling packaging units, in the vertical and/or horizontal direction.

12. The warehousing system as claimed in claim 9, comprising a central controller and at least one detection devices for detecting an externally readable identification feature of rolling packaging units, wherein the central controller is specified for evaluating detected identification features and for controlling one or a plurality of warehousing installations, one or a plurality of transport installations, and/or one or a plurality of selection installations such that warehouse management of rolling packaging units is performable.

13. A method for operating a warehousing installation as claimed in claim 1, wherein the rolling packaging unit is conveyed in a rolling manner on a storage receiving roller track, is fed to the storage device, is removed from the storage device, and is conveyed in a rolling manner on a storage removal roller track.

14. A method for operating a warehousing installation as claimed in claim 13, wherein the rolling packaging unit is conveyed in at least one of a rolling manner, propelled by gravity, in a storage receiving device, a storage device, and a storage removal device.

15. A picking device for forming picking lots having at least one roller-type bodies, comprising a plurality of warehousing shafts for warehousing roller-type bodies, at least one roller track for receiving roller-type bodies from the warehousing shafts wherein the roller-type bodies continue to roll on the roller track, a centralized controller for receiving picking orders and for controlling releasing devices of the warehousing shafts in such a manner that picking lots which correspond to the picking orders are formed on the at least one roller track wherein the roller-type bodies of a picking lot successively roll on the roller track.

16. The picking device as claimed in claim 15, comprising a buffer device having a plurality of buffer roller tracks and adjoining the roller track, wherein at least one turnout is specified for feeding picking lots to the plurality of roller tracks according to a desired plan.

17. The picking device as claimed in claim 16, comprising one or a plurality of connecting roller tracks which are disposed between the buffer roller tracks and are in each case specified for transferring picking lots or parts thereof from a first buffer roller track to a second buffer roller track.

18. The warehousing installation as claimed in claim 6, comprising a transport device for returning to the storage receiving device a rolling packaging unit which is rolling away from the storage removal device.

19. A picking device for forming picking lots having at least one roller-type bodies, comprising a plurality of warehousing shafts for warehousing roller-type bodies, at least one roller track for receiving roller-type bodies from the warehousing shafts, wherein the roller-type bodies continue to roll on the roller track, a centralized controller for receiving picking orders and for controlling releasing devices of the warehousing shafts in such a manner that picking lots which correspond to the picking orders are formed on the at least one roller track, and a buffer device having a plurality of buffer roller tracks and adjoining the roller track, wherein at least one turnout is specified for feeding picking lots to the plurality of roller tracks according to a desired plan.

20. The picking device as claimed in claim 19, comprising one or a plurality of connecting roller tracks which are disposed between the buffer roller tracks and are in each case specified for transferring picking lots or parts thereof from a first buffer roller track to a second buffer roller track.

* * * * *